United States Patent
Venkatraman et al.

(10) Patent No.: US 10,327,043 B2
(45) Date of Patent: Jun. 18, 2019

(54) METHOD AND SYSTEM FOR DISPLAYING INTERACTIVE QUESTIONS DURING STREAMING OF REAL-TIME AND ADAPTIVELY ASSEMBLED VIDEO

(71) Applicants: N. Dilip Venkatraman, Greater Noida (IN); Savitri Dilip, Greater Noida (IN)

(72) Inventors: N. Dilip Venkatraman, Greater Noida (IN); Savitri Dilip, Greater Noida (IN)

(*) Notice: Subject to any disclaimer, the term of this patent is extended or adjusted under 35 U.S.C. 154(b) by 0 days.

(21) Appl. No.: 15/250,721

(22) Filed: Aug. 29, 2016

(65) Prior Publication Data

US 2018/0014090 A1    Jan. 11, 2018

(51) Int. Cl.

| | |
|---|---|
| *G06F 16/30* | (2019.01) |
| *H04N 21/25* | (2011.01) |
| *H04N 21/231* | (2011.01) |
| *H04N 21/232* | (2011.01) |
| *H04N 21/258* | (2011.01) |
| *H04N 21/475* | (2011.01) |
| *H04N 21/845* | (2011.01) |
| *H04N 21/2668* | (2011.01) |
| *H04N 21/8405* | (2011.01) |
| *H04N 21/8545* | (2011.01) |

(52) U.S. Cl.
CPC ......... *H04N 21/8545* (2013.01); *G06F 16/30* (2019.01); *H04N 21/231* (2013.01); *H04N 21/232* (2013.01); *H04N 21/251* (2013.01); *H04N 21/25875* (2013.01); *H04N 21/25891* (2013.01); *H04N 21/2668* (2013.01); *H04N 21/4758* (2013.01); *H04N 21/8405* (2013.01); *H04N 21/8456* (2013.01)

(58) Field of Classification Search
CPC ............ H04N 21/8545; H04N 21/251; H04N 21/25875; H04N 21/25891; H04N 21/232; H04N 21/4758; H04N 21/8405; H04N 21/8456; H04N 21/231; H04N 21/2668; G06F 16/30
See application file for complete search history.

(56) References Cited

U.S. PATENT DOCUMENTS

| | | | | |
|---|---|---|---|---|
| 5,990,927 A | * | 11/1999 | Hendricks | H04H 20/06 348/E5.002 |
| 6,477,504 B1 | * | 11/2002 | Hamlin | G06Q 10/06 455/2.01 |
| 6,675,386 B1 | * | 1/2004 | Hendricks | H04N 7/17318 348/143 |

(Continued)

*Primary Examiner* — Benjamin R Bruckart
*Assistant Examiner* — Aklil M Tesfaye
(74) *Attorney, Agent, or Firm* — Kolisch Hartwell, P.C.

(57) ABSTRACT

The present disclosure provides a system and method for enabling display of interactive questions during streaming of a real time, dynamic, adaptive and non-sequentially assembled video. The method includes reception of a set of preference data associated with a user and a set of user authentication data. In addition, the method includes serving of the assembled video based on the received set of preference data to the user in real time. Moreover, the method includes fetching of a pre-defined set of interactive questions. Further, the method includes posting of the pre-defined set of interactive questions during the serving of the assembled video. Furthermore, the method includes collection of the set of user feedbacks for a posted pre-defined set of interactive questions from the user.

18 Claims, 11 Drawing Sheets

(56) References Cited

U.S. PATENT DOCUMENTS

| | | | | |
|---|---|---|---|---|
| 7,424,522 B2* | 9/2008 | Perry | G06F 17/2247 | |
| | | | 707/E17.118 | |
| 7,813,822 B1* | 10/2010 | Hoffberg | G06K 9/00369 | |
| | | | 381/73.1 | |
| 7,818,764 B2* | 10/2010 | Matz | H04N 7/163 | |
| | | | 725/34 | |
| 7,904,922 B1* | 3/2011 | Haberman | G06Q 10/107 | |
| | | | 715/201 | |
| 8,073,013 B2* | 12/2011 | Coleman | G06Q 30/02 | |
| | | | 370/486 | |
| 8,649,668 B2* | 2/2014 | Moorer | H04N 21/23424 | |
| | | | 386/343 | |
| 9,654,360 B1* | 5/2017 | Kellicker | H04L 43/06 | |
| 9,654,844 B2* | 5/2017 | Kim | H04N 21/8133 | |
| 2002/0194589 A1* | 12/2002 | Cristofalo | H04N 7/165 | |
| | | | 725/32 | |
| 2002/0199187 A1* | 12/2002 | Gissin | G06F 3/0481 | |
| | | | 725/32 | |
| 2003/0229900 A1* | 12/2003 | Reisman | G06F 17/30873 | |
| | | | 725/87 | |
| 2006/0282852 A1* | 12/2006 | Purpura | H04N 5/44543 | |
| | | | 725/39 | |
| 2007/0033625 A1* | 2/2007 | Chiu | G06Q 30/02 | |
| | | | 725/105 | |
| 2007/0094157 A1* | 4/2007 | Flinn | G06F 8/10 | |
| | | | 706/2 | |
| 2007/0101365 A1* | 5/2007 | Clark | G06Q 30/02 | |
| | | | 725/38 | |
| 2009/0328104 A1* | 12/2009 | Jones | H04N 7/17318 | |
| | | | 725/46 | |
| 2010/0008643 A1* | 1/2010 | Rakib | G06F 17/30799 | |
| | | | 386/341 | |
| 2012/0030029 A1* | 2/2012 | Flinn | G06Q 10/06 | |
| | | | 705/14.66 | |
| 2012/0159526 A1* | 6/2012 | Rao | G06Q 30/02 | |
| | | | 725/5 | |
| 2013/0031579 A1* | 1/2013 | Klappert | H04N 21/454 | |
| | | | 725/32 | |
| 2013/0166625 A1* | 6/2013 | Swaminathan | H04N 21/64738 | |
| | | | 709/203 | |
| 2013/0167168 A1* | 6/2013 | Ellis | H04N 5/44543 | |
| | | | 725/12 | |
| 2013/0246063 A1* | 9/2013 | Teller | G10L 13/033 | |
| | | | 704/235 | |
| 2014/0272902 A1* | 9/2014 | Bleile | G06Q 10/10 | |
| | | | 434/362 | |
| 2015/0208140 A1* | 7/2015 | Choi | H04N 21/4788 | |
| | | | 725/32 | |
| 2015/0230005 A1* | 8/2015 | Choi | H04N 21/4758 | |
| | | | 725/14 | |

* cited by examiner

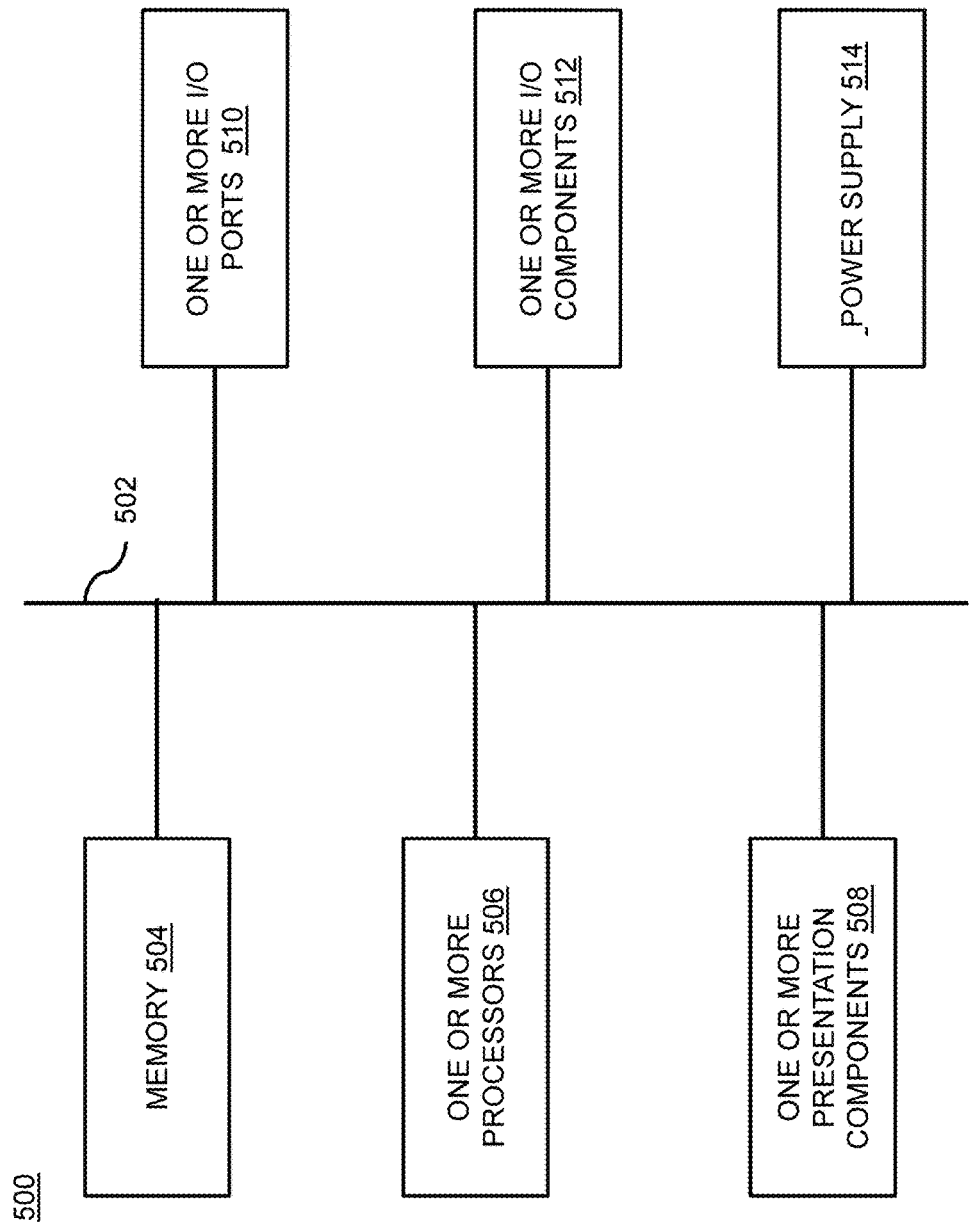

METHOD AND SYSTEM FOR DISPLAYING INTERACTIVE QUESTIONS DURING STREAMING OF REAL-TIME AND ADAPTIVELY ASSEMBLED VIDEO

TECHNICAL FIELD

The present disclosure relates to a field of online video serving. More specifically, the present disclosure relates to a method and system for enabling display of interactive question during streaming of assembled video.

BACKGROUND

With the advent of online multimedia revolution along with sudden rise in network bandwidth in recent years, the popularity of online video on demand platforms has suddenly gained momentum. These video on demand platforms provide a plethora of online streaming services. These services include television news, sports shows, television shows, non-televised shows, interviews, location specific events, national events, international events, movies and the like. The videos are arranged in different categories with different tags for complete video. Nowadays, there are many platforms that provide video assembling services on multiple on demand platforms. These platforms assemble videos based on complete set of tags and don't take into account dynamically changing user interests. In addition, these platforms don't perform dynamic meta-tagging based context and ontology of search queries of users on fragments of videos. The present platforms are inefficient in providing personalized assembled videos to individual users.

SUMMARY

In one aspect, the present disclosure provides a method for enabling display of interactive questions during streaming of a real time, dynamic, adaptive and non-sequentially assembled video. The method includes a step of receiving a set of preference data associated with a digitally processed repository of videos and a set of user authentication data. The set of preference data is selected from pre-defined selection criteria. In addition, the method includes another step of serving an assembled video related to the received set of preference data to the user in real time. The method includes yet another step of fetching a pre-defined set of interactive questions. The method includes yet another step of posting the pre-defined set of interactive questions during the serving of the assembled video. Furthermore, the method includes yet another step of collecting the set of user feedbacks of a posted pre-defined set of interactive questions from the user. The pre-defined set of interactive question is fetched to obtain a set of user feedbacks. The pre-defined set of interactive questions is posted in a first pre-defined order of preference. The pre-defined set of interactive questions is posted based on the semantic context information mined from the set of preference data of the user and the one or more tagged videos. In addition, the pre-defined set of interactive questions may be posted based on a real time viewing and selection behavior of the user, a request of the user for a series of questions and dynamic requests of posting questions from one or more publishers. In addition, each interactive question of the pre-defined set of interactive questions is posted in at least one of one or more pre-defined regions of a user interface. The collection of the set of user feedbacks is done in the real time.

In an embodiment of the present disclosure, the method includes yet another step of pushing the pre-defined set of interactive questions from at least one of one or more publishers and one or more system administrators. In addition the pre-defined set of interactive question is pushed by one or more third party content managers and one or more sponsors. The pre-defined set of interactive questions is pushed in the real time.

In an embodiment of the present disclosure, the method includes yet another step of extracting one or more tagged videos from the digitally processed repository of videos. The one or more tagged videos are related to the set of preference data of the user from. The one or more tagged videos are fetched based on a correlation of a set of tags with the set of preference data of the user. The set of tags are associated with each tagged video of the one or more tagged videos.

In an embodiment of the present disclosure, the method includes yet another step of fragmenting each tagged video of the one or more tagged videos into one or more tagged fragments. Each tagged video is fragmented into the one or more tagged fragments and each tagged fragment is characterized by a pre-determined interval of time. Each tagged video is fragmented based on segmentation of the tagged video for each pre-determined interval of time.

In an embodiment of the present disclosure, the method includes yet another step of segregating one or more mapped fragments of one or more tagged fragments into one or more logical sets of mapped fragments. The one or more mapped fragments are segregated based on a positive mapping of keywords from the set of preference data with a set of tags associated with each tagged fragment of one or more tagged fragments.

In an embodiment of the present disclosure, the method includes yet another step of mining semantic context information from each mapped fragment and each logical set of mapped fragments. The semantic context information includes an object specific context information and scene specific context information of each mapped fragment and each logical set of mapped fragments.

In an embodiment of the present disclosure, the method includes yet another step of clustering one or more logical sets of mapped fragments into corresponding one or more logical clusters of mapped fragments.

In an embodiment of the present disclosure, the method includes yet another step of assembling at least one of one or more logical clusters of mapped fragments in a second pre-defined order of preference to obtain the assembled video. Each logical cluster of mapped fragments is clustered based on analysis of the set of preference data of the user and semantic context information. The second pre-defined order of preference is derived from the set of preference data and the user profile.

In an embodiment of the present disclosure, the method includes yet another step of creating a user profile. The user profile is based on the set of user authentication data and the set of preference data. The user profile includes the set of preference data that is segregated on the basis of pre-defined selection criteria, the set of user authentication data, a past set of preference data, a physical location and a bio data of the user. The set of user authentication data includes an email address, an authentication key, a physical location and a time of request of video.

In an embodiment of the present disclosure, the method includes yet another step of transcoding the assembled video into a pre-defined video format. The assembled video is transcoded by utilizing a codec. The assembled video is transcoded to enable adaptive bitrate streaming on each communication device of the one or more communication devices. The adaptive bitrate streaming is based on one or more device parameters and one or more network parameters. The one or more device parameters include screen size, screen resolution and pixel density. The one or more network parameters include an IP address, network bandwidth, maximum bitrate support over network, throughput, connection strength and location of requesting server.

In an embodiment of the present disclosure, the method includes yet another step of rendering the assembled video for addition of one or more interactive elements and bi-directional flow.

In an embodiment of the present disclosure, the one or more regions include one or more video interactivity windows and one or more slots between the assembled video. In addition, the one or more regions include one or more overlay regions covering a pre-defined area of corresponding frames of the assembled video.

In an embodiment of the present disclosure, the method includes yet another step of updating the set of preference data associated with the user. In addition, the method includes updating the user profile based on variations in the set of preference data. The method includes updating the assembled video in the digitally processed repository of videos in real time and the set of user feedbacks.

In an embodiment of the present disclosure, the pre-defined selection criteria includes a set of intervals of video broadcast, a physical location of the user, an identified name of celebrity and a category of video.

In an embodiment of the present disclosure, the pre-defined set of interactive questions is based on a content of each assembled video, a quality associated with platform and satisfaction associated with the platform. In addition, the pre-defined set of interactive questions is based on user experience, quality of service, requirement of recommendations and the user profile.

In an embodiment of the present disclosure, the first pre-defined order of preference is set based on previous feedbacks from the user.

In another aspect, the present disclosure provides a computer system. The computer system includes one or more processors and a memory. The memory is coupled to the one or more processors. The memory is used to store instructions. The instructions in the memory when executed by the one or more processors cause the one or more processors to perform a method. The one or more processors perform the method for enabling display of interactive questions during streaming of a real time, dynamic, adaptive and non-sequentially assembled video. The method includes a step of receiving a set of preference data associated with a digitally processed repository of videos and a set of user authentication data. The set of preference data is selected from pre-defined selection criteria. In addition, the method includes another step of serving an assembled video related to the received set of preference data to the user in real time. The method includes yet another step of fetching a pre-defined set of interactive questions. The method includes yet another step of posting the pre-defined set of interactive questions during the serving of the assembled video. Furthermore, the method includes yet another step of collecting the set of user feedbacks of a posted pre-defined set of interactive questions from the user. The pre-defined set of interactive question is fetched to obtain a set of user feedbacks. The pre-defined set of interactive questions is posted in a first pre-defined order of preference. The pre-defined set of interactive questions is posted based on the semantic context information mined from the set of preference data of the user and the one or more tagged videos. In addition, the pre-defined set of interactive questions may be posted based on a real time viewing and selection behavior of the user, a request of the user for a series of questions and dynamic requests of posting questions from one or more publishers. In addition, each interactive question of the pre-defined set of interactive questions is posted in at least one of one or more pre-defined regions of a user interface. The collection of the set of user feedbacks is done in the real time.

In yet another aspect, the present disclosure provides a computer-readable storage medium. The computer readable storage medium enables encoding of computer executable instructions. The computer executable instructions when executed by at least one processor perform a method. The at least one processor performs the method for enabling display of interactive questions during streaming of a real time, dynamic, adaptive and non-sequentially assembled video. The method includes a step of receiving a set of preference data associated with a digitally processed repository of videos and a set of user authentication data. The set of preference data is selected from pre-defined selection criteria. In addition, the method includes another step of serving an assembled video related to the received set of preference data to the user in real time. The method includes yet another step of fetching a pre-defined set of interactive questions. The method includes yet another step of posting the pre-defined set of interactive questions during the serving of the assembled video. Furthermore, the method includes yet another step of collecting the set of user feedbacks of a posted pre-defined set of interactive questions from the user. The pre-defined set of interactive question is fetched to obtain a set of user feedbacks. The pre-defined set of interactive questions is posted in a first pre-defined order of preference. The pre-defined set of interactive questions is posted based on the semantic context information mined from the set of preference data of the user and the one or more tagged videos. In addition, the pre-defined set of interactive questions may be posted based on a real time viewing and selection behavior of the user, a request of the user for a series of questions and dynamic requests of posting questions from one or more publishers. In addition, each interactive question of the pre-defined set of interactive questions is posted in at least one of one or more pre-defined regions of a user interface. The collection of the set of user feedbacks is done in the real time.

BRIEF DESCRIPTION OF THE FIGURES

Figure 1A:
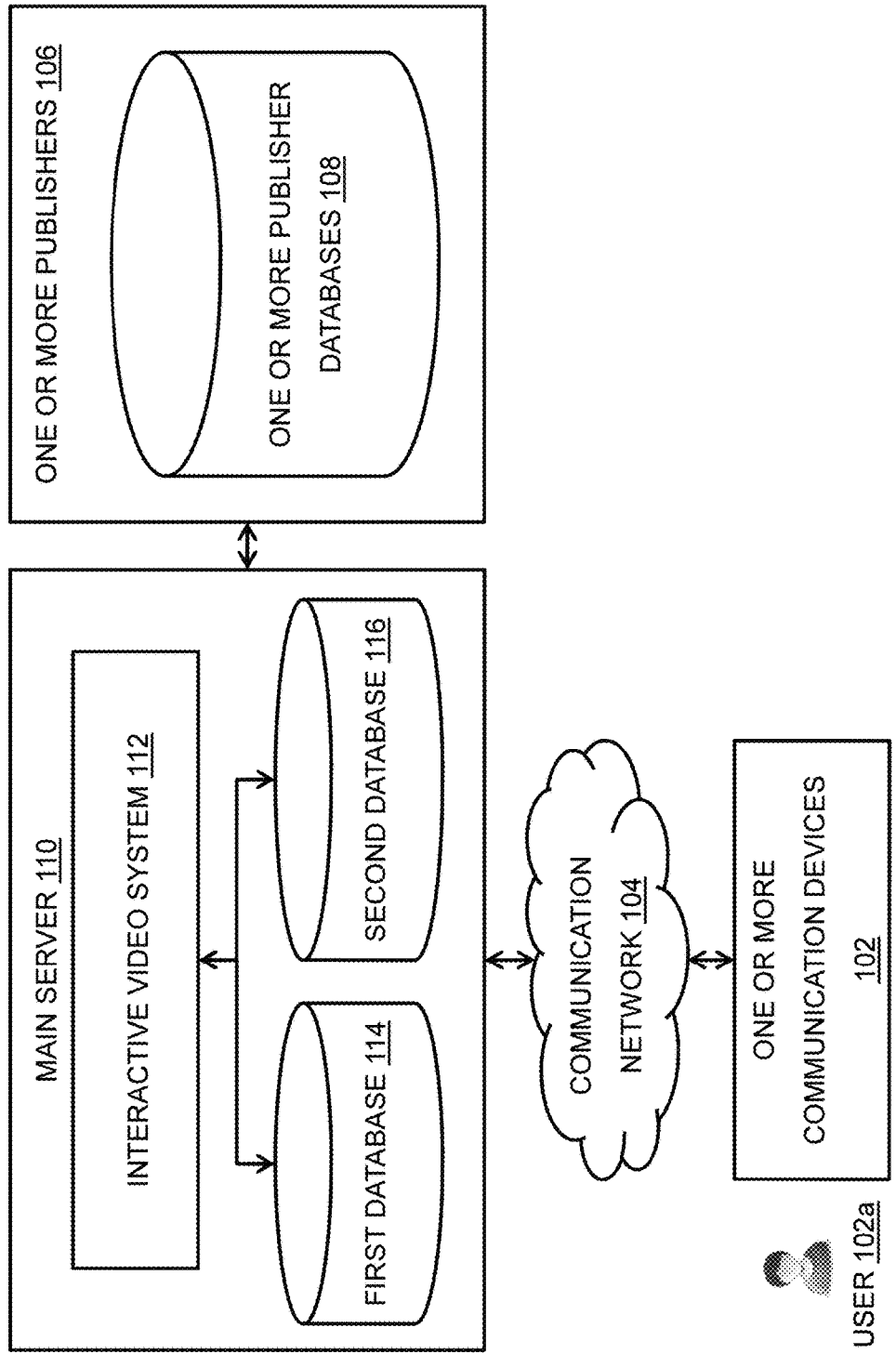
Figure 1B:
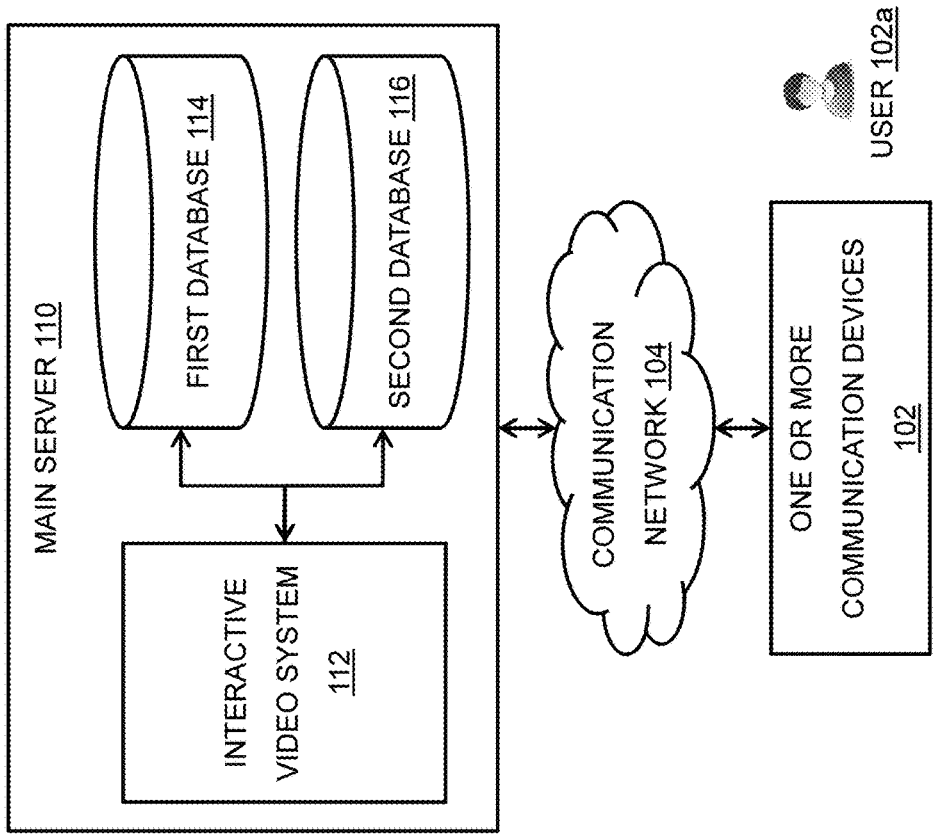
Figure 1C:
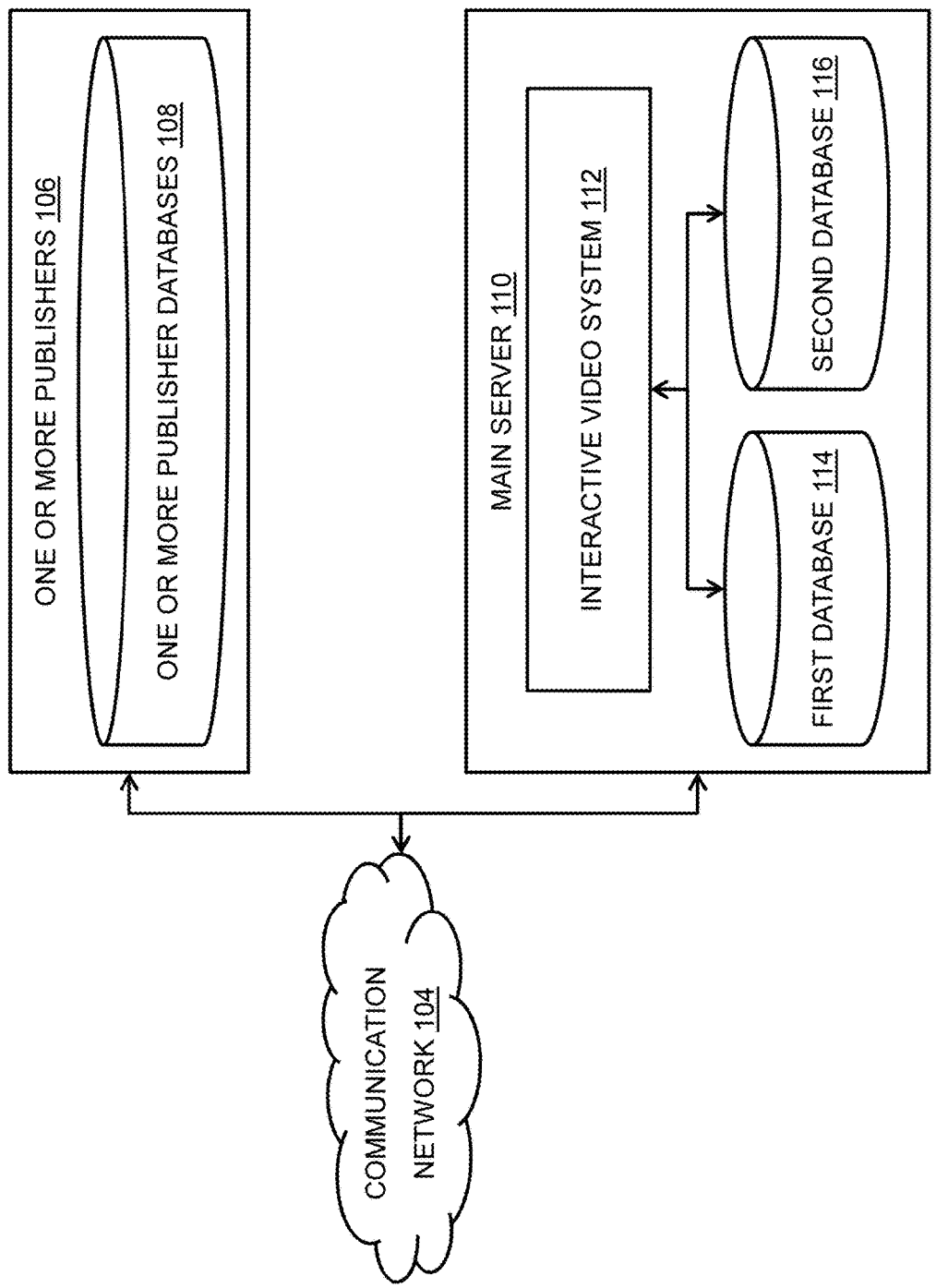
Figure 1D:
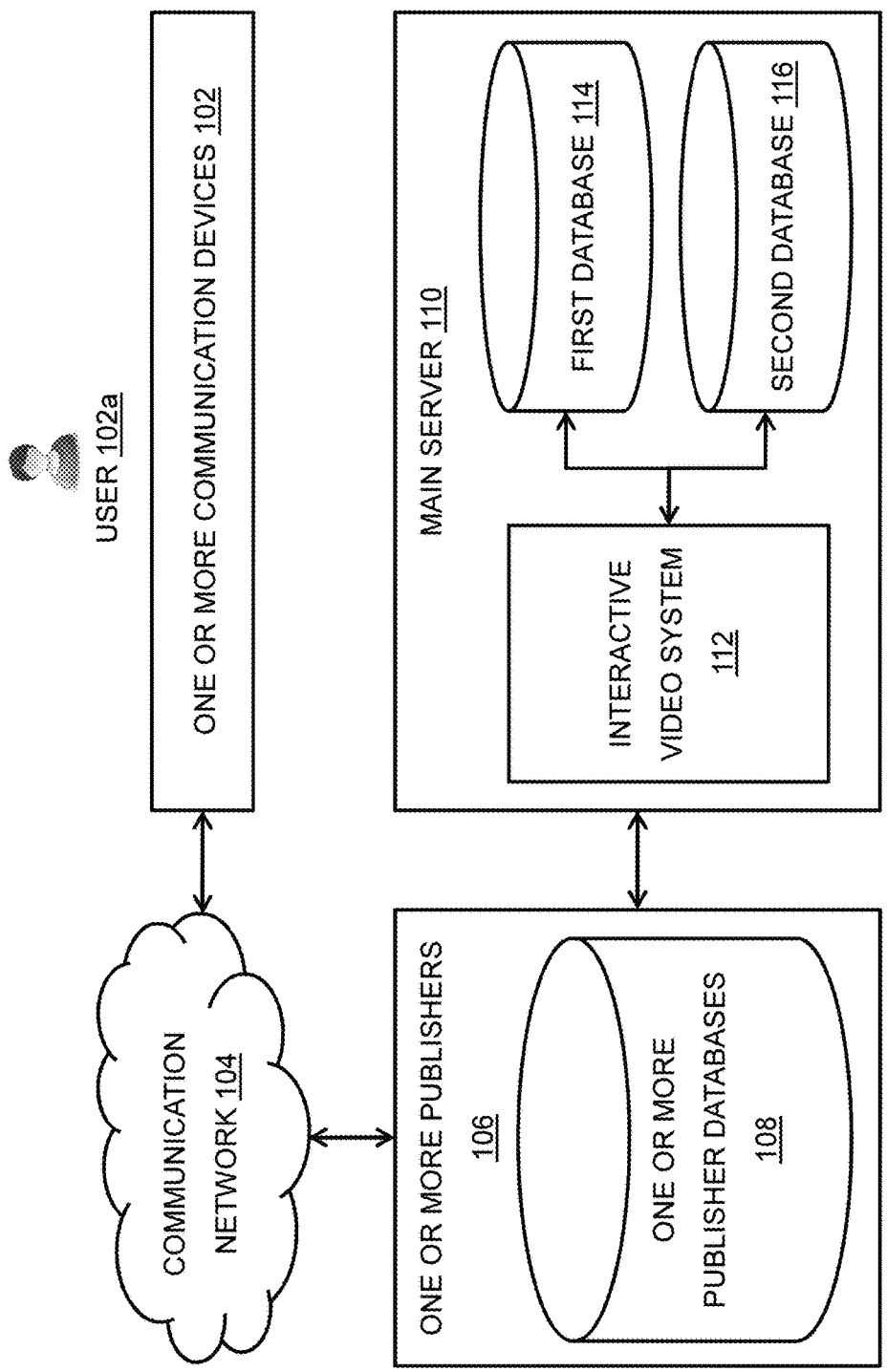
Figure 1E:
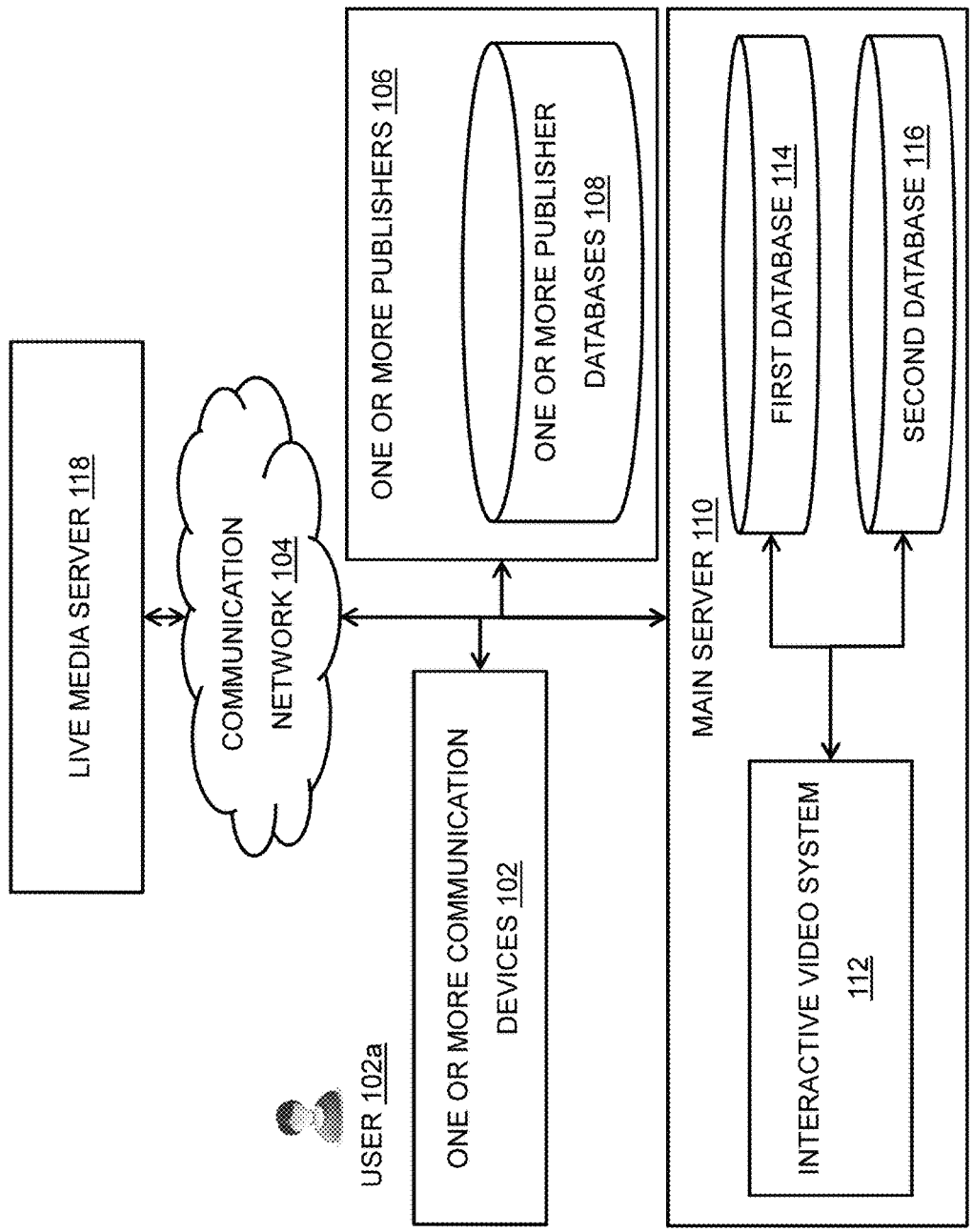
Figure 1F:
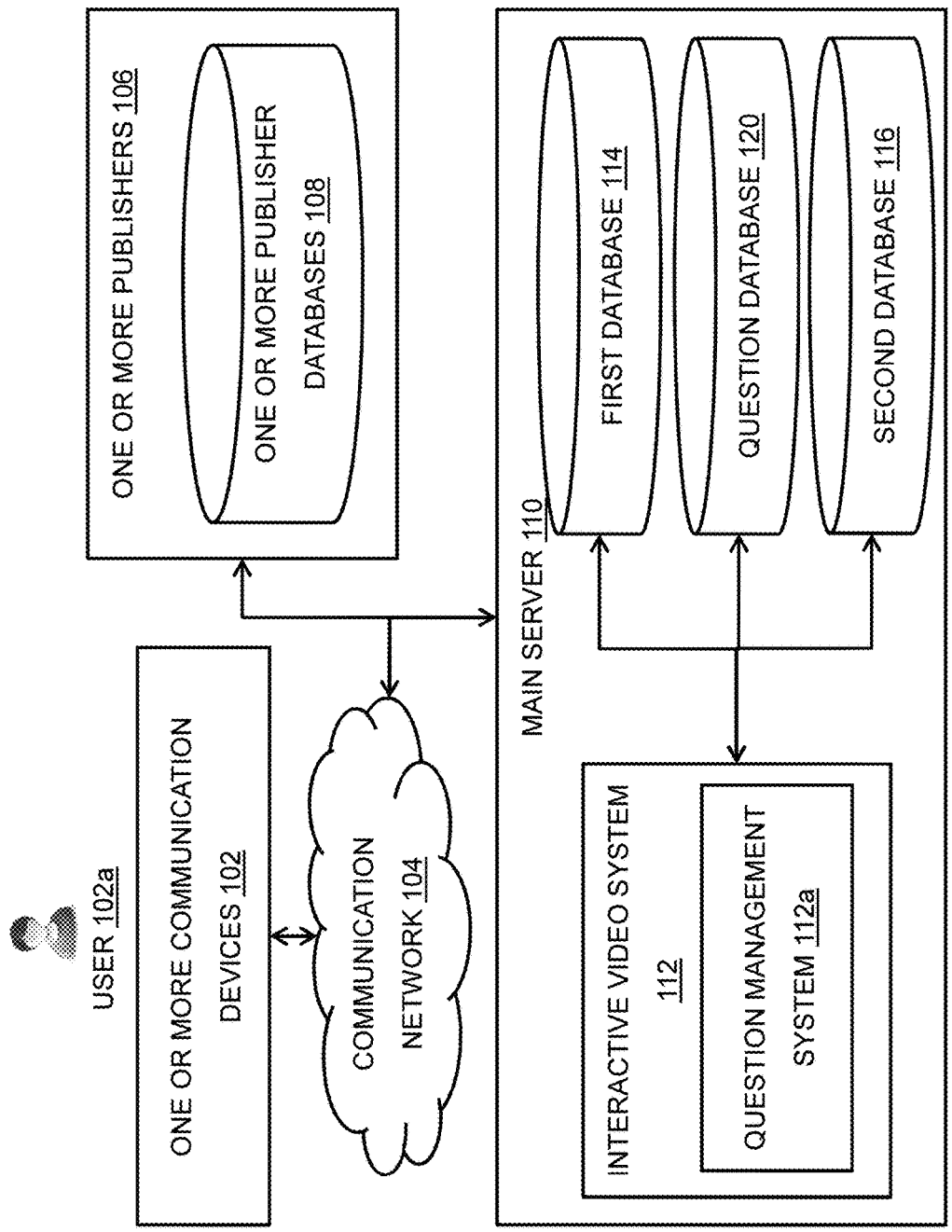
Figure 2A:
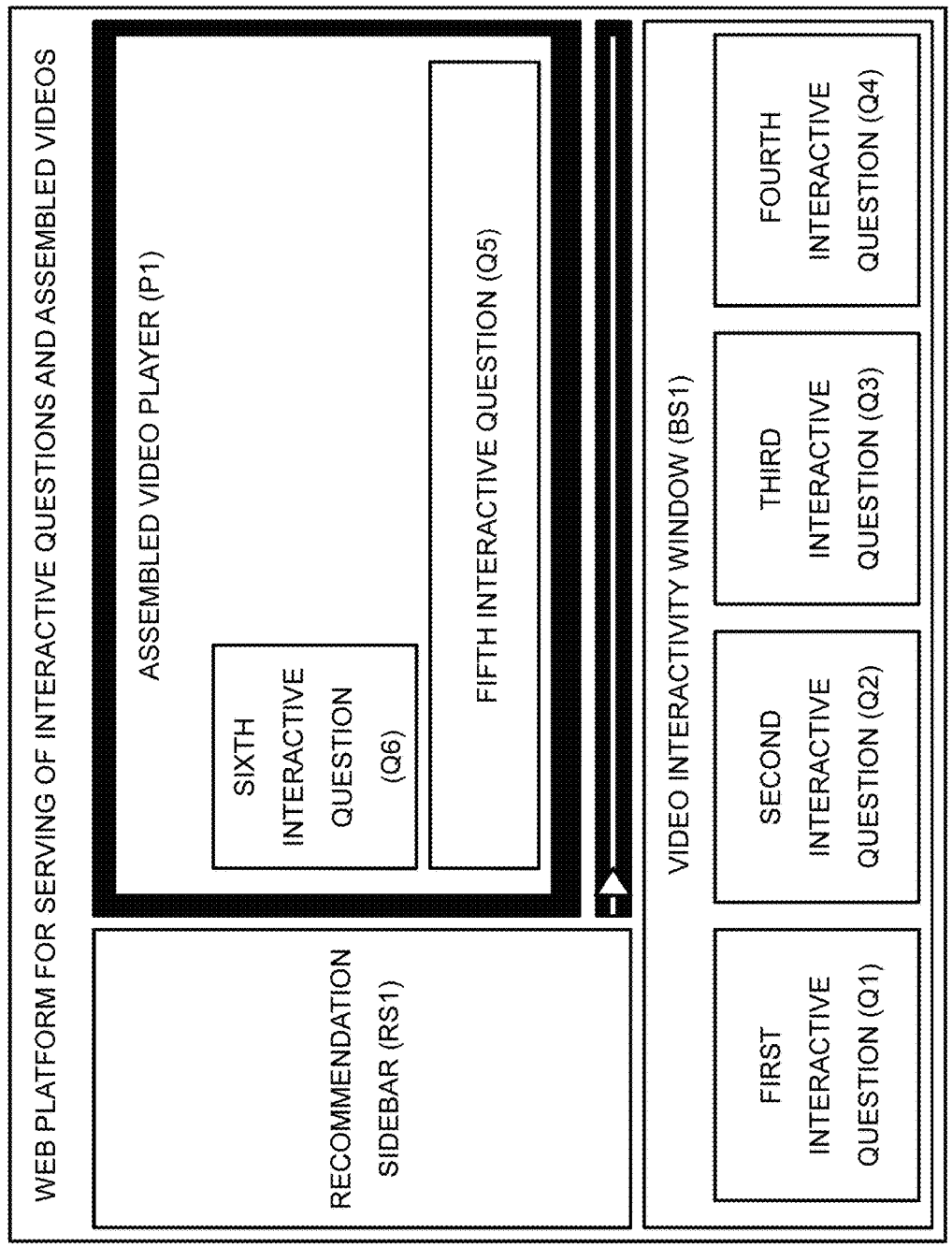
Figure 2B:
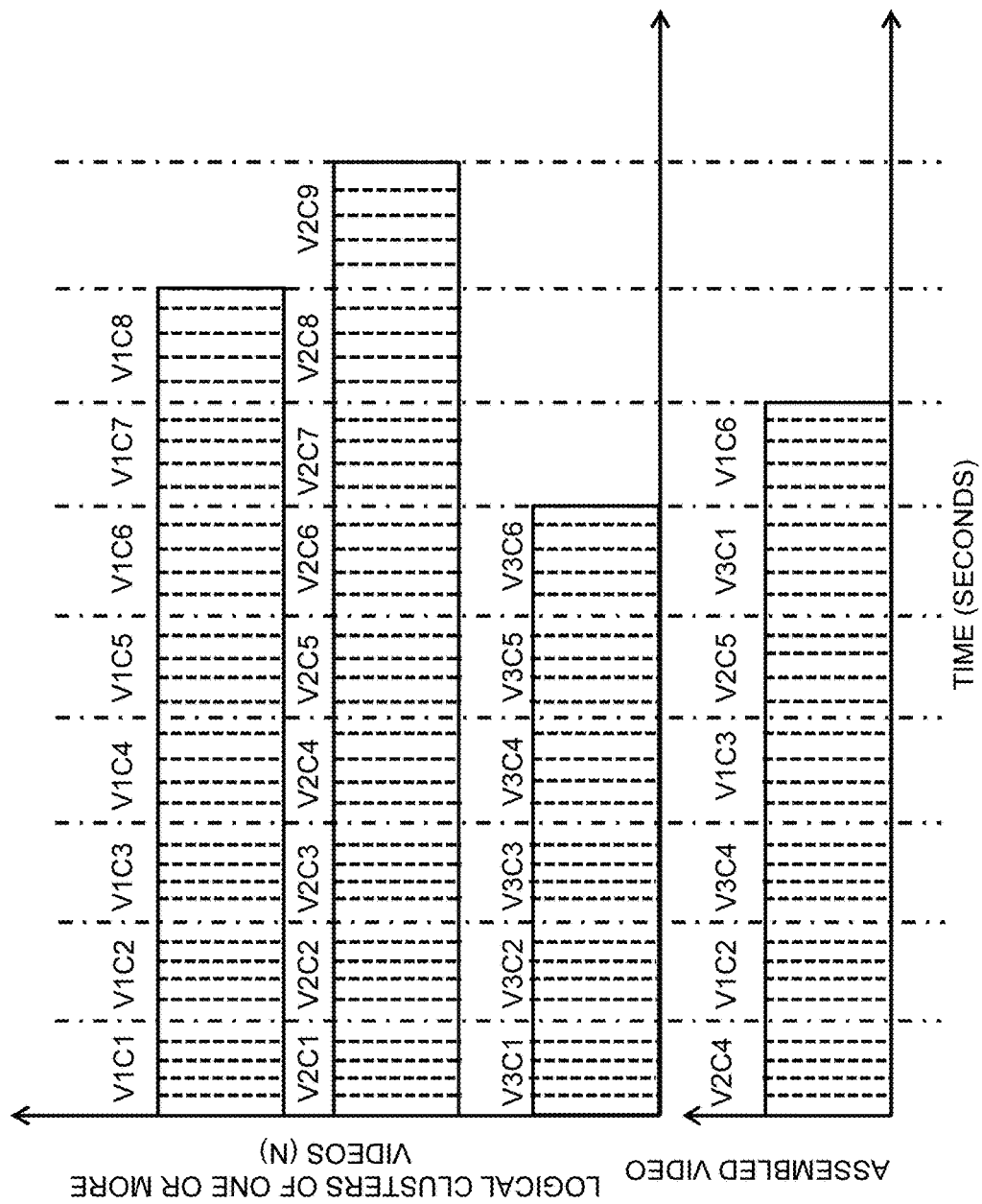
Figure 3:
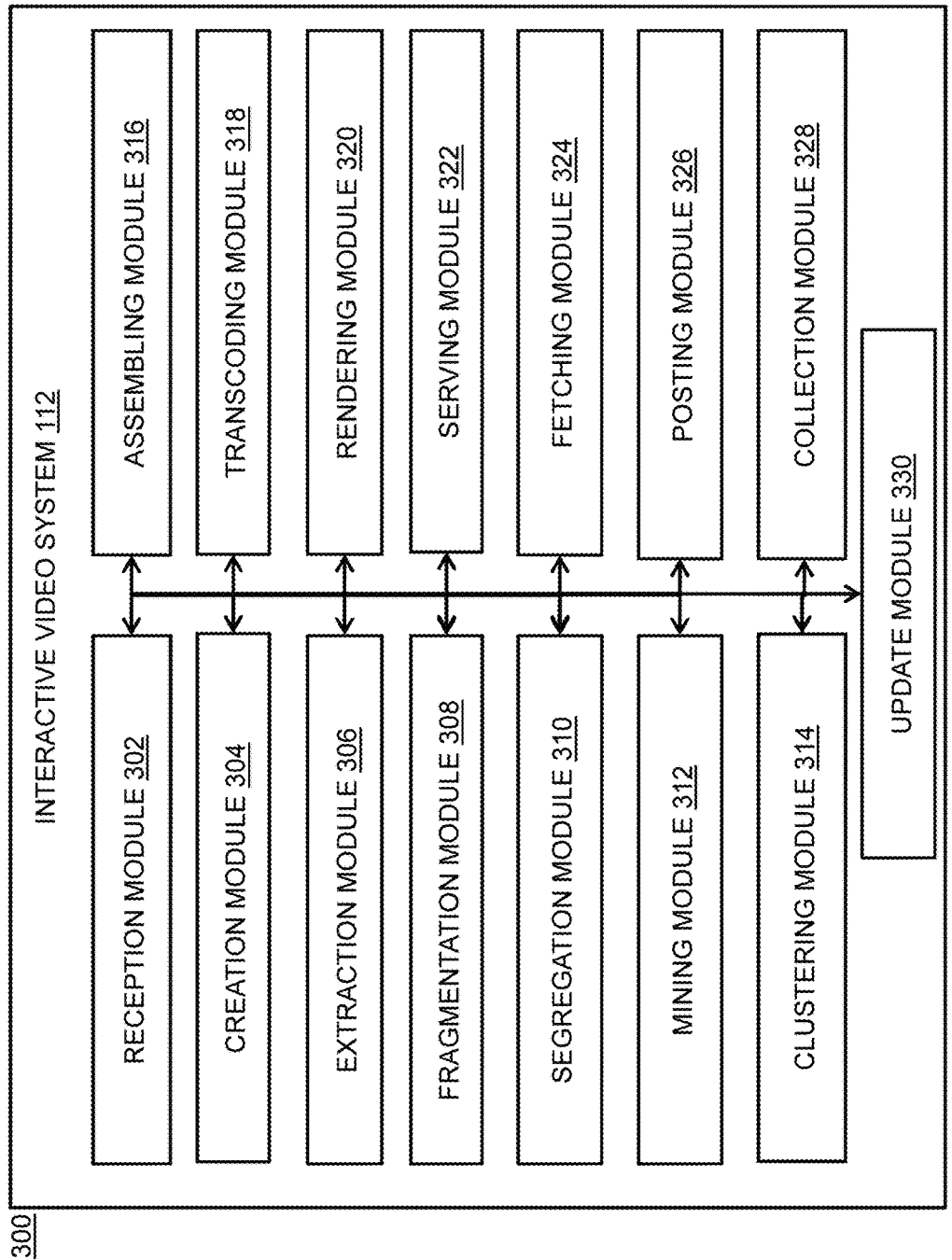
Figure 4:
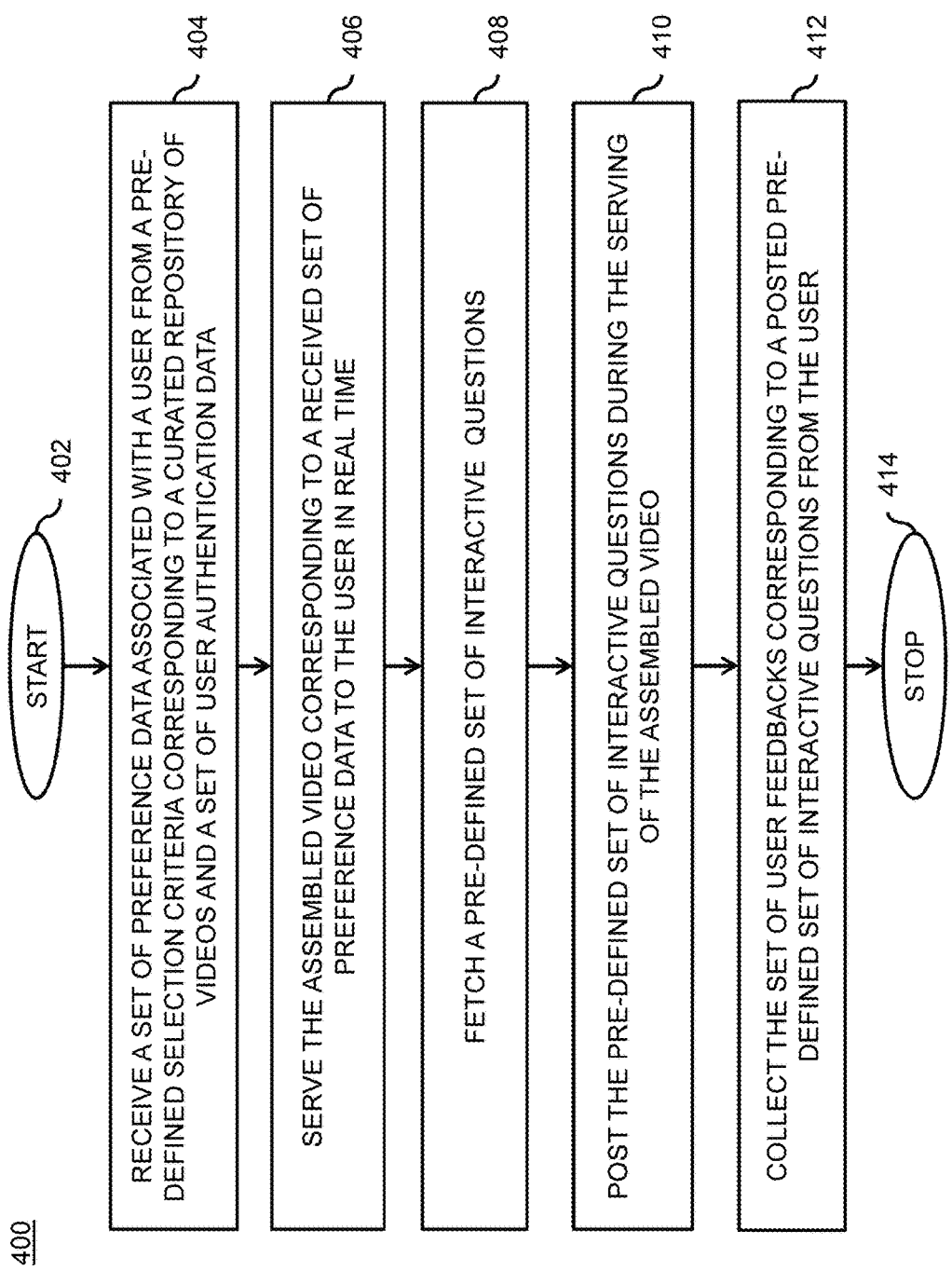

Having thus described the invention in general terms, reference will now be made to the accompanying drawings, which are not necessarily drawn to scale, and wherein:

FIG. 1A illustrates an interaction of a user and one or more publishers with an interactive video system, in accordance with an embodiments of the present disclosure;

FIG. 1B illustrates the interaction of the user with the interactive video system, in accordance with another embodiment of the present disclosure;

FIG. 1C illustrates the interaction of the one or more publishers with the interactive video system, in accordance with yet another embodiment of the present disclosure;

FIG. 1D illustrates the interaction between the user and the one or more publishers associated with the interactive video system, in accordance with yet another embodiment of the present disclosure;

FIG. 1E illustrates the interaction between a live media server and the interactive video system, in accordance with yet another embodiment of the present disclosure;

FIG. 1F illustrates the interaction between a question management system, a question database and the user, in accordance with yet another embodiment of the present disclosure;

FIG. 2A illustrates an example of a web platform for posting interactive questions during streaming of a real time, dynamic, adaptive and non-sequentially assembled video;

FIG. 2B illustrates the example of a real time, dynamic, adaptive and non-sequential assembling of one or more tagged clips corresponding to one or more videos;

FIG. 3 illustrates a block diagram of the interactive video system, in accordance with various embodiments of the present disclosure;

FIG. 4 illustrates a flow chart for enabling display of the interactive questions during the streaming of the real time, dynamic, adaptive and non-sequentially assembled video, in accordance with various embodiments of the present disclosure; and FIG. 5 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates an interaction of a user 102a and one or more publishers 106 with an interactive video system 112, in accordance with an embodiments of the present disclosure. The interactive video system 112 enables a pre-defined set of interactive questions posted during streaming of an assembled video. The interactive video system 112 interacts by invoking a set of user feedbacks from the user 102a in real time. The interactive video system 112 collects the set of user feedbacks to improve and add more user centric customization in video on demand service. Each interactive question is framed to collect statistics associated with video on demand service. In addition, the pre-defined set of interactive questions help in analysis of user interest behavior and user selection behavior. The interactive video system 112 may use machine learning to inform administrators about real time requirements of the user 102a. Accordingly, the interactive video system 112 may customize user interface and video assembling based on extrapolation of the set of user feedbacks. In an embodiment of the present disclosure, the user 102a and each of one or more publishers 106 interact with the interactive video system 112 based on a pay per view model. In another embodiment of the present disclosure, the user 102a and each of the one or more publishers interact with the interactive video system 112 based on a subscription based model. The above interaction of the user 102a and the one or more publishers 106 is part of an interactive environment. The interactive environment includes a communication device 102, a communication network 104, one or more communication devices 102, the one or more publishers 106 and a main server 110.

The user 102a is associated with the one or more communication devices 102. Each of the one or more communication devices 102 may be any suitable device with at least a display, a storage unit and network connectivity. In an embodiment of the present disclosure, each of the one or more communication devices 102 is a portable communication device. Example of the portable communication device includes a laptop, a smart phone, a tablet and the like. For example, the smartphone may be an Apple smartphone, an Android smartphone, a Windows smartphone and the like. In another embodiment of the present disclosure, each of the one or more communication devices 102 is a fixed communication device. Examples of the fixed communication device include a desktop, a workstation PC and the like. Each of the one or more communication devices 102 runs on an operating system. In general, the operating system provides an interface for the user 102a to interact with hardware of each of the one or more communication devices 102 and other connected devices. In an example, the operating system installed in the one or more communication devices 102 is a Windows based operating system. In another example, the operating system installed in the one or more communication devices 102 is a Mac based operating system. In yet another embodiment of the present disclosure, the operating system installed in the one or more communication devices 102 is a Linux based operating system. In yet another example, the operating system installed in the one or more communication devices 102 is a mobile operating system. Example of the mobile operating system includes but may not be limited to Android operating system, Apple iOS, Symbian based operating system, BADA operating system and blackberry operating system.

The one or more communication devices 102 are connected to the main server 110 through the communication network 104. Each communication device of the one or more communication devices 102 is registered with the main server 110. In general, the communication network 104 is a part of a network layer responsible for connection of two or more communication devices. Further, the communication network 104 may be any type of network. In an embodiment of the present disclosure, the type of communication network 104 is a wireless mobile network. In another embodiment of the present disclosure, the type of communication network 104 is a wired network with a finite bandwidth. In yet another embodiment of the present disclosure, the type of communication network 104 is a combination of the wireless and the wired network for the optimum throughput of data transmission. In yet another embodiment of the present disclosure, the type of communication network 104 is an optical fiber high bandwidth network that enables a high data rate with negligible connection drops.

The communication network 104 includes a set of channels. Each channel of the set of channels supports a finite bandwidth. The finite bandwidth of each channel of the set of channels is based on capacity of the communication network 104. Further, the one or more communication devices 102 possesses a unique machine address (hereinafter "MAC"). The MAC uniquely identifies the identity of each of the one or more communication devices 102 over the communication network 104. In addition, the communication network 104 provides a unique identity to each of the one or more communication devices 102. The unique identity is often referred to as an internet protocol (hereinafter "IP") address. In general, an IP address is a unique string of numbers separated by full stops that identify the one or more communication devices 102 using IP to communicate over the communication network 104. The IP address is characterized by IP versions. In an embodiment of the present disclosure, the IP address assigned to the one or more communication devices 102 is an IPv4 address. In another embodiment of the present disclosure, the IP address assigned to the one or more communication devices 102 is an IPv6 address.

The one or more communication devices 102 accesses data over the communication network 104 by utilizing one or more applications. The one or more applications include but may not be limited to a web browser, a mobile application, a widget and web applets. In general, each of the one or more applications have a graphical user interface (hereinafter "GUI") that is designed to display and fetch data from the main server 110. In addition, each of the one or more applications on any of the one or more communication devices associated with the user 102a may provide an interface for real time streaming, uploading and downloading of video files and audio files. The web browser installed in the one or more communication devices 102 may be any web browser. Example of the web browsers includes Google Chrome, Mozilla Firefox, Opera, UC Web, Safari, Internet Explorer and the like. In addition, the mobile application installed in at least one of the one or more communication devices 102 may be based on any mobile platform. Examples of the mobile platform include but may not be limited to Android, iOS Mobile, Blackberry and Bada.

In addition, the communication network 104 provides a unique identity to the communication device 102. The unique identity is often referred to as an internet protocol (hereinafter "IP") address. In general, an IP address is a unique string of numbers separated by full stops that identify the communication device 102 using IP to communicate over the communication network 104. The IP address is characterized by IP versions. In an embodiment of the present disclosure, the IP address assigned to the communication device 102 is an IPv4 address. In another embodiment of the present disclosure, the IP address assigned to the communication device 102 is an IPv6 address.

Each of the one or more communication devices 102 and the one or more publishers 106 are connected to the main server 110. In an embodiment of the present disclosure, the main server 110 interacts with requests from the one or more communication devices 102 through the communication network 104 (as shown in FIG. 1B). In another embodiment of the present disclosure, the main server 110 interacts with each of the one or more publishers 106 through the communication network 104 (as shown in FIG. 1C). In yet another embodiment of the present disclosure, the main server 110 interacts with requests of each of the one or more communication devices 102 through the one or more publishers 106 (as shown in FIG. 1D).

In addition, the user 102a and each of the one or more publishers 106 are a requestor of service from the main server 110. Each publisher of the one or more publishers 106 may be any website, web application, mobile application, third party applications and the like. Each publisher may be managed by a media content provider. In an example, XYZ is a news network and a broadcaster of news on television and online platform. The publisher of XYZ news may be a web based platform, mobile app based platform or any individual content provider of media content.

In another example, the publisher may be an individual or group providing videos to the interactive video system 112. Each of the one or more publishers 106 may be associated with a publisher database of the one or more publisher databases 108. Each publisher database of the one or more publisher databases 108 is a database of a digitally processed repository of videos. Each publisher of the one or more publishers 106 is registered on the main server 110.

The main server 110 provides a platform for video assembling and serving of interactive questions to the user 102a and each of the one or more publishers 106. The platform may be a web platform, mobile application platform, mobile web platform and the like. The main server 110 includes the interactive video system 112, a first database 114 and a second database 116. The interactive video system 112 services the request of the user 102a and each of the one or more publishers 106 in the real time. Further, the first database 114 is a proprietary database. The first database 114 includes a set of user authentication data and a user profile associated with the user 102a. Also, the first database 114 includes a set of publisher authentication data and a publisher profile associated with each publisher of the one or more publishers 106. The user 102a is identified uniquely by the set of user authentication data. The set of user authentication data includes an email address of the user 102a, a bio-data of the user 102a, an authentication key, a physical location and a standard time and time zone of login. The bio data of the user 102a may include full name, nickname, chronological age, gender and the like. In an embodiment of the present disclosure, the first database 114 is an encrypted database. In another embodiment of the present disclosure, the first database 114 is an unencrypted database. In addition, the first database 114 includes the set of feedbacks from each registered user 102a against each of the pre-defined set of interactive questions.

Further, the second database 116 is a database of digital processed repository of videos. The second database 116 stores one or more tagged videos. Each tagged video is virtually divisible into one or more tagged fragments. Each tagged video in the second database 116 is associated with a genre and a title. Examples of the genre include but may not be limited to sports, comedy, horror, drama, adventure, science fiction and autobiography. Also, each video may be associated with a popularity index and a number of views. In addition, each video is characterized by a set of technical specifications and non-technical specifications. The set of technical specifications include encoding format, frame rate, bit rate, frame height, frame width, pixel density, video resolution, size of video and the like. Each video may have different set of technical specifications. Each video in the second database 116 may have any encoding format. In an embodiment of the present disclosure, the encoding format is MPEG-4. In another embodiment of the present disclosure, the encoding format is FLV. In yet another embodiment of the present disclosure, the encoding format is AVI. In yet another embodiment of the present disclosure, the encoding format is 3GP. In yet another embodiment of the present disclosure, the encoding format is derived from proprietary codec. Moreover, the set of non-technical specifications include duration of video, a time reference associated with each video, the genre of video and the like.

Each video is tagged with one or more tags of a set of tags. The set of tags may correspond to a context of video, location reference in video, famous persons, events, genres, date, time and the like. In an example, a video of Moto GP race event is divisible into a lap of one or more laps. Each lap corresponds to a relative position of each racer in race chart. Each section may be tagged with the top racer of each lap. In another example, a video of interview of Mike Tyson is divisible into personal life, social life, professional life, struggles, success, events, etc. Each section of the interview of Mike Tyson can be tagged based on context of discussion. In an embodiment of the present disclosure, the second database 116 is updated with the one or more tagged videos from the one or more publishers 106. In another embodiment of the present disclosure, each publisher of the one or more publishers 106 updates the second database 116 with one or more untagged videos. Each video may be tagged with the set of tags and uploaded to the second database 116. Each video may be uploaded to the second database and tagged with the set of tags. The one or more untagged videos may be tagged manually by one or more administrators associated with the interactive video system 112.

The digital repository of videos in the second database 116 is updated with the one or more tagged videos from one or more sources. The one or more sources may include third party video content providers, the one or more publishers 106, the one or more advertisers, one or more sponsors and the like. Each publisher is a platform that uploads tagged videos to the digital repository of videos in the main server 110. The platform of each publisher may include a web based platform, a mobile application based platform, a web application based platform and the like. Additionally, the digital repository of videos may be updated and managed by the platform administrators. In an embodiment of the present disclosure, each video is manually tagged by the one or more administrators. In another embodiment of the present disclosure, the one or more administrators associated with operations of the main server 110 tag each video based on voice instructions. In yet another embodiment of the present disclosure, each video may be tagged based on speech rendering and analysis. In yet another embodiment of the present disclosure, each video is automatically tagged by the interactive video system 112. The automatic tagging of each video is done based on context mining and supervised digital fingerprinting of a set of frames. In yet another embodiment of the present disclosure, each video may be tagged by proprietary software and algorithms. In yet another embodiment of the present disclosure, each video may be tagged by the user 102a registered on the main server 110 and the publisher of the one or more publishers 106. In addition, each video may be tagged by media agency, advertiser, creative agency and the like. Each tag of the set of tags may be rated for ranking each tag and improving search efficiency.

Going further, the set of tags for each video may be updated based on real time determination of frequently used tags, frequently searched tags and less used tags. In addition, the set of tags for each video may be updated based on dynamic meta-tagging. The set of tags for each video may be updated based on incremental machine learning on the set of tags and the metadata for each tagged video. In an embodiment of the present disclosure, the metadata and meta-tagging for each tagged video may performed according to MPEG 7 standard. The MPEG 7 standard is also called as Multimedia Content Description Interface. For example, a video on Sachin may be tagged with Sachin, Master blaster, legend, god of cricket, and the like. The interactive video system 112 may determine the most used keyword to refer to content on Sachin. Let us suppose, in due course of 1 year, the interactive video system 112 determines that Sachin is frequently searched with "King of Cricket" tag. The interactive video system 112 updates the database of the set of tags associated with Sachin. In addition, the tags will be associated with any other video currently discussed in the public domain. If the name of Sachin surfaces in any new content related to any award show, then the tags will be automatically attached with the award show video too. The interactive video system 112 may present a Gantt chart of set of tags that are temporally classified based on occurrences within search queries and preferences of the users.

The updated set of tags may be determined based on feature detection and correlation in a specific quadrant of one or more frames of the tagged videos. For example, a 10 minute tagged video having a frame rate of 30 fps may be processed by selecting 1 key frame per second and performing feature detection. The feature detection may be based on incremental machine learning. Examples of the feature detection includes but may not be limited to face detection, object detection, motion detection, text detection, moving object detection and the like.

Also, the main server 110 provides the platform for real time display of the pre-defined set of interactive questions during streaming of the assembled video. The main server 110 dynamically handles requests of video assembling and posting of the pre-defined set of interactive questions. The platform may correspond to any one of the website, mobile application, web application, mobile browser based platform. In an embodiment of the present disclosure, the platform is a subscription based paid platform. In another embodiment of the present disclosure, the platform is a pay per view based paid platform. In yet another embodiment of the present disclosure, the platform is a free access, single registration and login based platform. The platform provides a video on demand service. Further, the platform includes but may not be limited to a media player, a list of thumbnails of the one or more tagged videos, recommendation panel, account panel, search panel, preference panel. The pre-defined selection criteria includes but may not be limited to a set of intervals of video broadcast, a physical location of the user 102a, an identified name of celebrity and categories of video. The pre-defined selection criteria are based on dates, time zones, days, seasons, physical locations, occasions, identified names, video genres and the like. The set of intervals of video broadcast corresponds to a time reference in the video. For example, the user 102a may be provided with criteria to view all the news aired between 4:00 PM to 4:15 PM of a specific day. In an example, the physical location may be used to narrow down content relevant to the physical location. The user 102*a* may like to watch videos relevant to the physical location. The physical location may be derived through many techniques. In an embodiment of the present disclosure, the physical location is derived from the global positioning system (hereinafter "GPS") module present in at least one of the one or more communication devices 102 associated with the user 102*a*. In another embodiment of the present disclosure, the physical location is derived from manual selection of the physical location from a pre-defined list of locations by the user 102*a*. In yet another embodiment of the present disclosure, the physical location is derived from internet service provider's server's location.

The user 102*a* enters the set of authentication data through the one or more communication devices 102. The user 102*a* provides a set of preference data to the main server 110 through the communication network 104. The set of preference data is a subset of the pre-defined selection criteria provided to the user 102*a*. In an example, the user 102*a* may select "Barack Obama", "elections" and "civil rights" from a politics category listed in the pre-defined selection criteria. In another example, the user may select "Tennis", "Serena Williams" and "Wimbledon" from sports category listed in the pre-defined selection criteria. The interactive video system 112 is configured to receive the set of preference data and extract the one or more videos corresponding to the set of preference data of the user 102*a* from the second database 116. For example, the interactive video system 112 may extract all the speeches of Barack Obama's at the time of presidential elections. In addition, the interactive video system 112 may filter any video from the speeches of Barack Obama without any sectional tag of civil rights. In addition, the interactive video system 112 is configured to virtually fragment and segregate the one or more videos. The interactive video system 112 is configured to virtually cluster and assemble logical clusters of mapped fragments, transcode and render the assembled video. The interactive video system 112 is configured to serve the assembled video, post or push the pre-defined set of interactive questions and collect the set of user feedbacks in the real time.

The interactive video system 112 receives the set of preference data associated with the user 102*a* from the pre-defined selection criteria. The set of preference data corresponds to the digitally processed repository of videos. In addition, the interactive video system 112 receives the set of user authentication data. The interactive video system 112 compares the set of authentication data corresponding to the user with corresponding set of authentication data in the first database 114. The interactive video system 112 allows for login based on a positive comparison of received set of authentication data with the set of the user authentication data present in the first database 114. In an embodiment of the present disclosure, the interactive video system 112 automatically handles content management associated with the set of preference data and the set of user authentication data. In another embodiment of the present disclosure, the content management associated with the set of preference data of the user 102*a* and the set of user authentication data is manually handled by one or more administrators. Each of the one or more administrators handles the content management by utilizing a content management tool. The content management corresponds to management of the user profile, streaming of the assembled video, editing and updating pre-defined selection criteria, editing pages in the user interface and the like.

The interactive video system 112 creates the user profile based on a received set of user authentication data, the set of preference data and the real time user viewing and selection behavior. The real time viewing and selection behavior corresponds to dynamic variation in the preferences of the user during due course of one or more active sessions of user on the video assembling and interactive video platform. In an embodiment of the present disclosure, the user profile is created based on a request from the user 102*a*. In another embodiment of the present disclosure, the user profile is created automatically by the interactive video system 112. The set of authentication data of the user 102*a* is stored in the user profile present in the first database 114. Furthermore, the interactive video system 112 extracts the one or more tagged videos related to the set of preference data of the user 102*a* from the digitally processed repository of videos present in the second database 116. The interactive video system 112 extracts the one or more tagged videos based on a correlation of the set of tags with the set of preference data associated with the user 102*a*. The set of tags are associated with each tagged video of the one or more tagged videos.

The interactive video system 112 virtually fragments each tagged video of the one or more tagged videos into the one or more tagged fragments. Each tagged video is fragmented into the one or more tagged fragments and each tagged fragment is characterized by length measured in a pre-determined interval of time. For example, the pre-determined interval of time is 5 seconds for each tagged fragment of a 300 seconds video. In an embodiment of the present disclosure, the pre-determined interval of time for each tagged fragment may be manually adjusted by the one or more administrators. In another embodiment of the present disclosure, the pre-determined interval of time for each tagged fragment may be automatically adjusted by the interactive video system 112 based on proprietary algorithms. Each tagged video is fragmented based on segmentation of the tagged video for each pre-determined interval of time. Also, the fragmentation of each tagged video is a virtual fragmentation in temporary memory of the main server 110.

The interactive video system 112 virtually segregates one or more mapped fragments of the one or more tagged fragments into one or more logical sets of mapped fragments. In an embodiment of the present disclosure, the one or more mapped fragments are segregated based on a positive mapping of keywords from the set of preference data with the set of tags. The set of tags are associated with each tagged fragment of the one or more tagged fragments. In addition, each tagged videos of the one or more tagged videos in the second database 116 is associated with a set of metadata. In another embodiment of the present disclosure, the one or more mapped fragments are segregated based on the positive mapping of the keywords from the set of preference data with the set of metadata. Each logical set of mapped fragments may correspond to a common tag from each tagged video of the one or more tagged videos.

For example, a user, say ABC provides preferences like Comedy, Jim Carrey and funny to the interactive video system 112. The interactive video system 112 fetches one or more tagged videos related to Jim Carrey, Comedy and funny preferences. The interactive video system fragments each of the one or more videos into tagged fragments. Each tagged fragment may be of 5 second duration. The interactive video system 112 may segregate the mapped fragments from the tagged fragments based on a positive mapping with the set of preference data of the user ABC.

The interactive video system 112 mines semantic context information from each mapped fragment of the one or more mapped fragments. In addition, the interactive video system 112 mines semantic context information from each logical set of mapped fragments of the one or more logical sets of mapped fragments. The semantic context information includes object specific context information and scene specific context information of each mapped fragment and each logical set of mapped fragments. For example, the one or more mapped fragments may be associated with common tags of comedy, movie, Hollywood and Jim Carrey. The interactive video system 112 mines semantic context information that includes dialogues, music, location, faces and the like. The interactive video system 112 may mine sentiments of characters in each mapped fragment from feature analysis of audio and faces. The interactive video system 112 may mine features that include geometrical shapes, color saturation, motion of objects, scene changes, number of scenes, animations and the like.

Going further, the interactive video system 112 virtually clusters the one or more logical sets of mapped fragments into one or more logical clusters of mapped fragments. Each logical cluster of mapped fragments is derived from at least one of the one or more logical sets of mapped fragments. For example, the interactive video system 112 fetches three tagged comedy videos of Jim Carrey. The interactive video system 112 fragments each of the three tagged comedy videos of Jim Carrey. The mapped fragments out of tagged fragments for each tagged video may be segregated into the logical set of mapped fragments. The mapped fragments for action and comedy tags in the three videos may be segregated to obtain the logical set of mapped fragments. The logical set of mapped fragments for comedy and action tags for each tagged video may be clustered in the logical cluster.

The interactive video system 112 performs auto volume leveling on each audio segment associated with the one or more mapped fragments or logical clusters of the mapped fragments. For example, the first logical cluster may contain fragments having different volume levels. The interactive video system 112 may dynamically normalize volume levels on a uniform scale. In addition, the interactive video system 112 may perform image normalization on each frame of the mapped fragments.

In an embodiment of the present disclosure, the interactive video system 112 virtually assembles at least one of the one or more logical clusters of mapped fragments in a pre-defined order of preference to obtain an assembled video. Each logical cluster of mapped fragments is assembled based on an analysis of the set of preference data of the user and the semantic context information. For example, the user may provide preferences like adventure, Nicholas Cage, movie and fighting scenes. The one or more tagged video with tags of adventure and Nicholas Cage and movie may be tagged with specific fighting scenes. The interactive video system 112 mines semantic context information from each tagged video through searching for fights related keywords from rendered speeches, scene detection, object movement, music, speech analysis, tone analysis and the like. The semantic context information may be used to automatically tag, fragment, cluster or assemble videos on demand.

In an embodiment of the present disclosure, the pre-defined order of preference is derived from the set of preference data, the user profile and the semantic context information mined from the activities of user 102a. In another embodiment of the present disclosure, the pre-defined order of preference is derived from preferences of users with similar user profiles and situations. In another embodiment of the present disclosure, the interactive video system 112 virtually assembles at least one of the one or more logical clusters of mapped fragments in a dynamically generated pre-defined order of preference. The dynamically generated pre-defined order of preference is based on a real time viewing and selection behavior of the user 102a. In an embodiment of the present disclosure, the pre-defined order of preference corresponds to a linear and non-sequential assembling of the one or more logical set of mapped fragments. In another embodiment of the present disclosure, the pre-defined order of preference corresponds to a non-linear and non-sequential assembling of the one or more logical set of mapped fragments. Each logical set of mapped fragments is a virtually clustered in the temporary memory of the main server 110. The interactive video system 112 presents a personalized video solution for each user 102a.

The interactive video system 112 removes duplicate tags from set of tags of the real time and dynamically assembled video in the temporary memory of the main server 110. The duplicate tags along the set of metadata of the assembled video are flushed in the disk for faster transmission and caching of the assembled video on different communication devices.

In an example, a person, say X selects tags corresponding to sports. The person (X) selects tags corresponding to Mike Tyson and boxing. In addition, the person selects the knockout tag from the pre-defined selection criteria. The knockout moment is often an ending portion of a boxing match. The interactive video system 112 fetches the one or more tagged videos associated to matches of Mike Tyson. The interactive video system 112 searches for a knockout tag in at least one of the one or more pre-defined sections of each tagged video. The interactive video system 112 fragments each tagged video of Mike Tyson into tagged fragments and segregates logical set of mapped fragments for knockout by Mike Tyson tag from other tagged clips of Mike Tyson. The interactive video system 112 may clusters each logical set of mapped fragments to obtain logical clusters of mapped fragments. The logical clusters may be assembled in the real time to obtain the assembled video. In addition, the interactive video system 112 may assemble each logical cluster or mapped fragments for the knockout by Mike Tyson based on number of views. The interactive video system 112 dynamically serves a reassembled video to the user 102a in the real time upon a click on any video recommendations. The interactive video system 112 dynamically reassembles the one or more mapped fragments or logical clusters of mapped fragments in the real time.

The user 102a may request to stream the assembled video that includes specific segments of 360° videos (or immersive videos), the tagged set of videos and a live video (as shown in FIG. 1E). The main server 110 is associated with a live media server 118. The live media server 118 is a high bandwidth media server that is configured to stream live videos to each communication device of the one or more communication devices 102. The interactive video system 112 virtually fetches and segregates the one or more mapped fragments of the 360° videos and the one or more tagged videos. The mapped fragments of 360° videos and mapped fragments of tagged videos are derived from comparison of the keywords from the set of preference data with tags of the 360° videos and traditional videos. In addition, the interactive video system 112 requests a live media server 118 for live streaming of the live video. The interactive video system 112 virtually assembles the mapped fragments of 360° videos and mapped fragments of videos. The interactive video system 112 streams the virtually assembled mapped fragments of 360° videos and the mapped fragments of videos. In addition, the interactive video system 112 switches from the assembled content to the live video received from the live media server in the real time.

The interactive video system 112 transcodes the assembled video into a pre-defined video format by utilizing a codec. The assembled video is transcoded to enable adaptive bitrate streaming on each communication device of the one or more communication devices 102. The assembled video is transcoded based on one or more device parameters and one or more network parameters. The one or more device parameters include screen size, screen resolution, pixel density and the like. Further, the one or more network parameters include an IP address, network bandwidth, maximum bitrate support over network, throughput, connection strength, location of requesting server and the like. In an example, the user 102*a* may be using a laptop with a limited bandwidth insufficient for high definition streaming of videos. Accordingly, the interactive video system 112 transcodes the assembled video in format up-loadable from the main server 110. In another example, the user 102*a* may be using a smartphone with a low bandwidth and a lower display resolution. Accordingly, the interactive video system 112 transcodes the assembled video in the format viewable for the lower display resolution screens. Further, the interactive video system 112 utilizes salt stack to scale up and down transcoding requirements. The salt stack utilizes shell scripts to execute FFMPEG in the main server 110.

In an embodiment of the present disclosure, the interactive video system 112 transcodes the assembled video in 144 p quality. In another embodiment of the present disclosure, the interactive video system 112 transcodes the assembled video in 240 p quality. In yet another embodiment of the present disclosure, the interactive video system 112 transcodes the assembled video in 360 p quality. In yet another embodiment of the present disclosure, the interactive video system 112 transcodes the assembled video in 480 p quality. In yet another embodiment of the present disclosure, the interactive video system 112 transcodes the assembled video in 720 p quality. In yet another embodiment of the present disclosure, the interactive video system 112 transcodes the video in 1080 p quality. In yet another embodiment of the present disclosure, the interactive video system 112 transcodes the assembled video in any standard quality.

In addition, the interactive video system 112 trans-rates and trans-sizes the assembled video to enable adaptive streaming for each communication device of the one or more communication devices 102. The interactive video system 112 transcodes the assembled in any standard video coding format, container and audio coding format. Examples of the video coding format includes but may not be limited to MPEG-2 Part 2, MPEG-4 Part 2, H.264 (MPEG-4 Part 10), HEVC, Theora, Real Video RV40, VP9, and AV1. Examples of the container includes but may not be limited to Matroska, FLV, MPEG-4 part 12, VOB, HTML and real media. Example of the audio coding format includes but may not be limited to MP3, AAC, Vorbis, FLAC, and Opus. In an embodiment of the present disclosure, the assembled video is in the MP4 file format. In another embodiment of the present disclosure, the assembled video in the matroska file format. In yet another embodiment of the present disclosure, the assembled video is in the AVI file format. In yet another embodiment of the present disclosure, the assembled video is in the FLV file format. In yet another embodiment of the present disclosure, the assembled video is in the 3GP file format.

The assembled video is transcoded based on an audio codec and a video codec. The audio codec and the video codec may be any generic or proprietary codec. Example of the video codecs include but may not be limited to H.265/MPEG-H HEVC codec, H.264/MPEG-4 AVC codec, H.263/MPEG-4 codec, H.263/MPEG-4 Part 2 codec, H.262/MPEG-2 codec and ACT-L3 codec. The compression performed by the video codecs on the assembled video is a lossy compression. In addition, the interactive video system 112 utilizes a media streaming communication protocol to stream the real time and dynamically assembled video on each of the one or more communication devices 102. In an embodiment of the present disclosure, the media streaming communication protocol is a HTTP live streaming (hereinafter "HLS") protocol. In another embodiment of the present disclosure, the media streaming communication protocol is a MPEG based dynamic adaptive streaming over HTTP (hereinafter "MPEG-DASH") protocol.

The interactive video system 112 renders the assembled video for addition of one or more interactive elements and a bi-directional flow. The one or more interactive elements include forward playback, reverse playback, fast playback and slow playback. In addition, the one or more interactive elements include touch based navigation option, swipe based navigation option, click based navigation option, voice based navigation, motion based navigation and the like.

In an embodiment of the present disclosure, the interactive video system 112 includes a question management system 112*a* (as shown in FIG. 1F). The interactive video system 112 is associated with a question database 120. The question database 120 includes a large repository of structured, indexed and classified questions. The large repository of questions includes contest based questions, product specific questions, sponsor questions, publisher based question, quality of service questions, service feedback questions, marketing questions, ad targeting questions and the like.

In addition, each question may be associated with graphical media. The graphical media may include flash files, images, animations, GIFs, clips and the like. In addition, the question management system 112*a* manages and serves a pre-defined set of interactive questions to the user 102*a*. The question management system 112*a* sorts and rates the difficulty and rank of each interactive question. In an example, a contest of 10 questions may be ranked based on the difficulty level of each question. Each question may be assigned a score of difficulty in order to assess the feedbacks for each interactive question in the real time. In an embodiment of the present disclosure, the difficulty level of each question may be set manually by the one or more administrators. In another embodiment of the present disclosure, the question management system 112*a* may determine the difficulty level based on supervised machine learning algorithms. In yet another embodiment of the present disclosure, the question management system may determine the difficulty level based on delay and errors in responses for each question shared among multiple users. In addition, the question database 112*a* is updated with metadata of each question and the set of user feedbacks on each question. The question management system 112*a* records the id of each posted question in the question database 120 in order to avoid repetitive posting. The graphical media for each question may be presented for call to action objective. For example, the user may be presented with an advertisement of a specific car and an interactive questionnaire overlaid on top of the advertisement video. The user 102a answers the questionnaire and is targeted with an option for test drive. The details of the user 102a may be transferred to an associated car dealer for arranging test drive for the user. In addition, the interactive questionnaire may be supplemented or complemented by images or text on videos hotspots.

Further, the interactive video system 112 fetches the pre-defined set of interactive questions from the large repository of interactive questions present in the question database 120. The pre-defined set of interactive questions is based on content of each assembled video, a quality and satisfaction associated with the web based platform, user experience, quality of service, requirement of recommendations and the user profile. In addition, the pre-defined set of interactive questions may be any type of interactive questions. In an embodiment of the present disclosure, each interactive question is text based multiple choice questions. In another embodiment of the present disclosure, each interactive question is touch enabled question. In yet another embodiment of the present disclosure, each interactive question is an image based interactive question. Each interactive question may provide user 102a with an option to interact and provide feedback. The pre-defined set of interactive questions is fetched to invoke the set of user feedbacks for a pre-defined set of feedback subjects. The pre-defined set of feedback subjects includes but may not be limited to quality of service, user experiences, user satisfaction and suggestions for any change in the user interface.

The interactive video system 112 posts the pre-defined set of interactive questions during the streaming of the assembled video in the communication device 102 of the user 102a. The pre-defined set of interactive questions is posted based on the semantic context information mined from the set of preference data of the user 102a and the one or more tagged videos. In addition, the pre-defined set of interactive questions may be posted based on a real time viewing and selection behavior of the user 102a, a request of the user 102a for a series of questions and dynamic requests of posting questions from one or more publishers 106. Each interactive question of the pre-defined set of interactive questions is posted in at least one of one or more pre-defined regions of the user interface. The one or more regions includes but may not be limited to one or more video interactivity windows, recommendation sidebars and video player. In an embodiment of the present disclosure, the first pre-defined order of preference is set by one or more administrators associated with management of the platform hosted by the main server 110. In another embodiment of the present disclosure, the first pre-defined order of preference is set based on previous feedbacks from the user 102a. In yet another embodiment of the present disclosure, the first pre-defined order of preference is based on increasing order of difficulty. In yet another embodiment of the present disclosure, the first pre-defined order of preference is based on decreasing order of difficulty.

Each interactive question of the pre-defined set of interactive questions may be posted based on any suitable condition. In an embodiment of the present disclosure, each interactive question is posted based on a time based trigger. In another embodiment of the present disclosure, each interactive question is posted based on a scene based trigger. In yet another embodiment of the present disclosure, each interactive question is posted based on manual trigger set by the one or more administrators. In yet another embodiment of the present disclosure, each interactive question may be posted based on context mining of previous set of user feedbacks. In an embodiment of the present disclosure, the interactive video system 112 dynamically fetches the set of interactive questions from the repository of questions. The set of interactive question are fetched to obtain the set of user feedbacks. In another embodiment of the present disclosure, the interactive video system 112 dynamically enables the publishers, advertisers or any third party websites to directly push interactive questions to the user 102a during the streaming of each assembled logical cluster in the assembled video. The set of user feedbacks are collected dynamically in the real time corresponding to each posted interactive question. The user 102a may be given an option to either reply to the interactive question or skip the question. The interactivity may be further enhanced by introducing interactive elements like shake to reply, voice based feedback, tap to reply, haptic feedbacks, gesture based feedbacks and the like.

In another embodiment of the present disclosure, the interactive video system 112 enables pushing of the pre-defined set of interactive questions from at least one of one or more publishers, one or more system administrators and the like. The pre-defined set of interactive questions is pushed in the real time.

The interactive video system 112 collects the set of user feedbacks corresponding to a posted pre-defined set of interactive questions from the user 102a. The collection of the set of user feedbacks is done in the real time. Further, the interactive video system 112 updates the user profile corresponding to the user 102a based on variation in the set of preference data in the first database 114. In addition, the interactive video system 112 updates the assembled video and the set of user feedbacks in the real time.

It may be noted that in FIG. 1A, FIG. 1B, FIG. 1C and FIG. 1D, the communication device 102 corresponding to the user 102a is connected to the main server 110; however, those skilled in the art would appreciate that more number of communication devices associated with more number of users is connected to the main server 110. It may be noted that in FIG. 1A, FIG. 1B, FIG. 1C and FIG. 1D, the main server 110 is the provider of video assembling and posting of pre-defined set of interactive questions; however, those skilled in the art would appreciate that more number of main servers synchronously provide video assembling and inter-active question posting services. It may be noted that in FIG. 1A, FIG. 1B, FIG. 1C and FIG. 10, the communication device 102 associated with the user 102a is connected to the main server 110 through the communication network 104; however, those skilled in the art would appreciate that more number of communication devices associated with more number of users is connected to more number of main servers through more number of communication networks.

FIG. 2A illustrates an example of the web platform for posting the interactive questions during streaming of a real time, dynamic, adaptive and non-sequentially assembled video. The web platform includes an assembled video player (P1), a recommendation sidebar (RS1) and a video interactivity window (BS1). The web platform is accessed from the communication device 102 of the user 102a. The user 102a selects an assembled video (AV1) from the recommendation sidebar (RS1). The assembled video player (P1) loads the logical clusters of mapped fragments of the assembled video (AV1) virtually in the memory. The question management system 112a fetches a first interactive question (Q1), a second interactive question (Q2), a third interactive question (Q3), a fourth interactive question (Q4) from the question database 120. In addition, the question management system fetches a fifth interactive question (Q5) and a sixth interactive question (Q6) from the question database 120. Each question may be associated with a context of specific segment of the assembled videos or may be associated with a specific contest. In an example, the question management system 112 may post the first question (Q1), the second question (Q2), the third question (Q3), the fourth question (Q4), the fifth question (Q5), the sixth question (Q6) on specific regions of the platform. Each question may be supplemented by video, text or image hotspots. The interactive questions may be posted on any specific region of the platform. The specific regions may include video interactive windows, video player, header, footer and the like. In another example, the one or more publishers 106 pushes the first question (Q1), the second question (Q2), the third question (Q3), the fourth question (Q4), the fifth question (Q5) and the sixth question (Q6). The user 102a may interact with any of the first question (Q1), the second question (Q2), the third question (Q3) and the fourth question (Q4) by providing feedbacks. In addition, the user 102a may interact with any one of the fifth question (Q5) and the sixth question (Q6). The question management system updates and responds to the feedbacks associated with the first question (Q1), the second question (Q2), the third question (Q3), the fourth question (Q4) the fifth question (Q5) and the sixth question (Q6).

FIG. 2B illustrates an example of the real time, dynamic, adaptive and non-sequential assembling of the one or more mapped fragments of the one or more tagged videos. In the example, the one or more tagged videos include a first video (V1), a second video (V2) and a third video (V3). The interactive video system 112 receives the request of service from the user 102a through the communication network 104. The user 102a provides the set of preference data and the set of authentication data to the interactive video system 112. The interactive video system 112 fetches the first video (V1), the second video (V2) and the third video (V3) from the second database 116. In addition, the one or more pre-defined sections of the first video (V1), the second video (V2) and the third video (V3) are tagged with the set of tags. The interactive video system 112 fragments and logically clusters the first video (V1) into a first logical cluster (V1C1), a second logical cluster (V1C2), a third logical cluster (V1C3), a fourth logical cluster (V1C4), a fifth logical cluster (V1C5) and a sixth logical cluster (V1C6). In addition, the interactive video system fragments and logically clusters a seventh logical cluster (V1C7) and an eighth logical cluster (V1C8). Accordingly, the interactive video system 112 fragments and logically clusters the second video (V2) into a first logical cluster (V2C1), a second logical cluster (V2C2) and a third logical cluster (V2C3). The interactive video system 112 clusters a fourth logical cluster (V2C4), a fifth logical cluster (V2C5) and a sixth logical cluster (V2C6). In addition, the interactive video system 112 clusters a seventh logical cluster (V2C7), an eighth logical cluster (V2C8) and a ninth logical cluster (V2C9). The interactive video system performs similar operations on the third video (V3). The fragmentation of the first video (V1), the second video (V2) and third video (V3) is done for a pre-determined interval of time. The first set of logical clusters (V1C1-V1C8), the second set of logical clusters (V2C1-V2C9) and the third set of logical clusters (V3C1-V3C6) includes 8, 9 and 6 logical clusters of fragments respectively.

The interactive video system 112 non-linearly and non-sequentially assembles the fourth logical cluster (V2C4), the second logical cluster (V1C2), the fourth logical cluster (V3C4) and the third logical cluster (V1C3). In addition, the interactive video system assembles the fifth logical cluster (V2C5), the first logical cluster (V3C1) and the sixth logical cluster (V1C6) to obtain the assembled video. The pre-defined order of preference of corresponding clips is derived from the set of the preference data of the user 102a and the user profile corresponding to the user 102a. The assembled video is transcoded into the pre-defined format by the interactive video system 112. The assembled video in transcoded format is streamed to the user 102a in the real time.

FIG. 3 illustrates a block diagram 300 of the interactive video system 112, in accordance with various embodiments of the present disclosure. The block diagram 300 illustrates one or more components of the interactive video system 112. The one or more components collectively enable display of the interactive questions during streaming of the real time, dynamic, adaptive and non-sequentially assembled video. It may be noted that to explain the system elements of the FIG. 3, references will be made to the system elements of the FIG. 1A, FIG. 1B, FIG. 1C and FIG. 1D. The block diagram 300 includes a reception module 302, a creation module 304, an extraction module 306, a fragmentation module 308, a segregation module 310 and a mining module 312. In addition, the block diagram 300 includes a clustering module 314, assembling module 316, transcoding module 318, a rendering module 320, a serving module 322, a fetching module 324, a posting module 326, a collection module 328 and an update module 330.

The reception module 302 receives the set of preference data associated with the user 102a. The reception module 302 receives the set of preference data from the pre-defined selection criteria. The pre-defined selection criteria are related to the digitally processed repository of videos (as discussed above in the detailed description of FIG. 1A). Further, the creation module 304 creates the user profile based on the received set of user authentication data and the set of preference data (as described above in the detailed description of FIG. 1A).

The extraction module 306 extracts the one or more tagged videos based on the set of preference data of the user 102a from the digitally processed repository of videos. The extraction module 306 extracts the one or more videos based on the correlation of the set of tags with the set of preference data associated with the user 102a (as discussed above in the detailed description of FIG. 1A). Further, the fragmentation module 308 fragments each tagged video of the one or more tagged videos into the one or more tagged fragments. Each tagged video is fragmented into the one or more tagged fragments and each tagged fragment is characterized by a pre-determined interval of time. Each tagged video is fragmented based on segmentation of the tagged video for each pre-determined interval of time (as discussed above in the detailed description of FIG. 1A).

Going further, the segregation module 310 segregates one or more mapped fragments of the one or more tagged fragments into one or more logical sets of mapped fragments. The segregation module 310 the one or more mapped fragments based on a positive mapping of keywords from the set of preference data with the set of tags associated with each tagged fragment of the one or more tagged fragments (as described above in the detailed description of FIG. 1A). The mining module 312 mines semantic context information from each mapped fragment of the one or more mapped fragments and each logical set of mapped fragments of the one or more logical sets of mapped fragments. The semantic context information includes an object specific context information and scene specific context information of each mapped fragment and each logical set of mapped fragments (as discussed in detailed description of FIG. 1A). Further, the clustering module 314 clusters the one or more logical sets of mapped fragments into the one or more logical clusters of mapped fragments (as discussed above in the detailed description of FIG. 1A).

Further, the assembling module 316 assembles at least one of the one or more logical clusters of mapped fragments in the pre-defined order of preference to obtain the assembled video. Each logical cluster of mapped fragments is assembled based on the analysis of the set of preference data of the user and the semantic context information (as discussed in detailed description of FIG. 1A). The transcoding module 318 transcodes assembled video into a pre-defined video format. The transcoding module 318 utilizes a codec. The codec may be any standard codec or proprietary codec. The transcoding module 318 transcodes assembled video to enable adaptive bitrate streaming on each of the one or more communication devices 102. The adaptive bitrate streaming is based on one or more device parameters and one or more network parameters (as discussed above in the detailed description of FIG. 1A). The rendering module 320 renders the assembled video for addition of one or more interactive elements and a bi-directional flow (as discussed above in the detailed description of FIG. 1A).

The serving module 322 serves the assembled video based on the received set of preference data. The assembled video is served to the user 102a in the real time (as stated above in the detailed description of the FIG. 1A). The fetching module 324 fetches the pre-defined set of interactive questions. The pre-defined set of interactive question is fetched to obtain the set of user feedbacks (as mentioned above in the detailed description of the FIG. 1A).

The posting module 326 posts the pre-defined set of interactive questions during the serving of the assembled video. The pre-defined set of interactive questions is posted in the first pre-defined order of preference. In addition, each interactive question of the pre-defined set of interactive question is posted in the one of one or more pre-defined regions of the user interface (as provided above in the detailed description of the FIG. 1A). The collection module 328 collects the set of user feedbacks associated to the posted pre-defined set of interactive questions from the user 102a (as mentioned above in the detailed description of the FIG. 1A). The update module 330 updates the set of preference data associated with the user 102a. In addition, the update module 330 updates the user profile and the set of user feedbacks. The user profile is updated based on variations in the set of preference data Moreover, the update module 330 updates the assembled video in the digitally processed repository of videos in the real time (as described above in the detailed description of the FIG. 1A).

FIG. 4 illustrates a flow chart 400 for enabling navigation to the one or more discrete segments of the real time dynamic and adaptive non-linear, non-sequentially assembled video, in accordance with various embodiments of the present disclosure. It may be noted that to explain the process steps of flowchart 400, references will be made to the system elements of the FIG. 1A, FIG. 1B, FIG. 1C, FIG. 1D, FIG. 1E and the FIG. 3. It may also be noted that the flowchart 400 may have lesser or more number of steps.

The flowchart 400 initiates at step 402. Following step 402, at step 404, the reception module 302 receives the set of preference data associated with the user 102a from the pre-defined selection criteria. The pre-defined selection criteria correspond to digitally processed repository of videos. In addition, the reception module 302 receives the set of user authentication data. At step 406, the serving module 318 serves the assembled video to the user in the real time. The assembled video is served based on the received set of preference data. At step 408, the fetching module 320 fetches the pre-defined set of interactive questions. At step 410, the posting module 322 posts the pre-defined set of interactive questions during the serving of the assembled video. At step 412, the collection module 324 collects the set of user feedbacks from the user 102a. The set of user feedbacks corresponds to a posted pre-defined set of interactive questions. The flowchart 400 terminates at step 416.

It may be noted that the flowchart 400 is explained to have above stated process steps; however, those skilled in the art would appreciate that the flowchart 400 may have more/less number of process steps which may enable all the above stated embodiments of the present disclosure.

FIG. 5 illustrates a block diagram of a computing device 500, in accordance with various embodiments of the present disclosure. The computing device 500 includes a bus 502 that directly or indirectly couples the following devices: memory 504, one or more processors 506, one or more presentation components 508, one or more input/output (I/O) ports 510, one or more input/output components 512, and an illustrative power supply 514. The bus 502 represents what may be one or more buses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device 500 that can be used in connection with one or more embodiments of the present invention. Distinction is not made between such categories as "workstation," "server," "laptop," "hand-held device," etc., as all are contemplated within the scope of FIG. 5 and reference to "computing device."

The computing device 500 typically includes a variety of computer-readable media. The computer-readable media can be any available media that can be accessed by the computing device 500 and includes both volatile and non-volatile media, removable and non-removable media. By way of example, and not limitation, the computer-readable media may comprise computer storage media and communication media. The computer storage media includes volatile and nonvolatile, removable and non-removable media implemented in any method or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 500. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. The memory 504 may be removable, non-removable, or a combination thereof. Exemplary hardware devices include solid-state memory, hard drives, optical-disc drives, etc. The computing device 500 includes one or more processors that read data from various entities such as memory 504 or I/O components 512. The one or more presentation components 508 present data indications to a user or other device. Exemplary presentation components include a display device, speaker, printing component, vibrating component, etc. The one or more I/O ports 510 allow the computing device 500 to be logically coupled to other devices including the one or more I/O components 512, some of which may be built in. Illustrative components include a microphone, joystick, game pad, satellite dish, scanner, printer, wireless device, etc.

The present disclosure has several advantages over the prior art. The present disclosure provides a solution for real time interactive feedback from the user. The real time feedback provides solution in customizing and improving service quality of the user. The present disclosure facilitates dynamic clustering of clips corresponding to multiple videos having same tags. Also, the present disclosure provides a solution to dynamically reassemble clips in the real time to suit the demand of the user. The assembled video can be navigated bi-directionally and any discrete segment of the video can be selected by the user. The present disclosure provides a method efficient in mining and attaching tags corresponding to multiple sections of the video. The assembled video solves tedious video reediting work of publishers. The present disclosure facilitates a seamless viewing experience bundled with personalized video solution within a single assembled video for the users. The present solution saves the switching and selection and sorting time of user by presenting a seamless single video having multiple segments that are related to the preferences of the user.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented display method for enabling display of interactive questions during streaming of a real time, dynamic, adaptive and non-sequentially assembled video, the method comprising:
   receiving at an interactive video system with a processor, a set of preference data associated with a user from a pre-defined selection criteria corresponding to a digitally processed repository of videos and a set of user authentication data, wherein the pre-defined selection criteria comprises a set of intervals of video broadcast, a physical location of the user, an identified name of a celebrity and a category of video;
   serving at the interactive video system with the processor, an assembled video corresponding to the received set of preference data to the user in real time;
   fetching at the interactive video system with the processor, a pre-defined set of interactive questions, wherein the pre-defined set of interactive questions being fetched for obtaining a set of user feedbacks, wherein the pre-defined set of interactive questions being based on a content of each assembled video, a quality and satisfaction associated with platform, user experience, quality of service, requirement of recommendations and a user profile, wherein the user profile being created based on the set of user authentication data and the set of preference data, wherein the user profile comprises the set of preference data segregated on a basis of the pre-defined selection criteria, the set of user authentication data, a past set of preference data, a physical location of the user and a bio data of the user;
   posting at the interactive video system with the processor, the pre-defined set of interactive questions during the serving of the assembled video, wherein the pre-defined set of interactive questions being posted in a first pre-defined order of preference, wherein the pre-defined set of interactive questions being posted based on a semantic context information mined from the set of preference data of the user and one or more tagged videos, a real time viewing and selection behavior of the user, a request of the user for a series of questions, dynamic requests of posting questions from one or more publishers, wherein the semantic context information being mined from each mapped fragment of one or more mapped fragments and each logical set of mapped fragments of one or more logical sets of mapped fragments and wherein each interactive question of the pre-defined set of interactive questions being posted in at least one of one or more pre-defined regions; and
   collecting at the interactive video system with the processor, the set of user feedbacks corresponding to the posted pre-defined set of interactive questions from the user, wherein the set of user feedbacks being collected in the real time.

2. The computer-implemented display method as recited in claim 1, further comprising pushing at the interactive video system with the processor, the pre-defined set of interactive questions from at least one of the one or more publishers, one or more system administrators, one or more third party content managers and one or more sponsors, wherein the pre-defined set of interactive questions being pushed in the real time.

3. The computer-implemented display method as recited in claim 1, further comprising extracting at the interactive video system with the processor, the one or more tagged videos related to the set of preference data of the user from the digitally processed repository of videos, wherein the one or more tagged videos being fetched based on a correlation of a set of tags associated with each video of the one or more tagged videos with the set of preference data associated with the user.

4. The computer-implemented display method as recited in claim 1, further comprising fragmenting at the interactive video system with the processor, each tagged video of the one or more tagged videos into one or more tagged fragments, wherein each tagged video being fragmented into the one or more tagged fragments, wherein each tagged fragment being characterized by a pre-determined interval of time and wherein each tagged video being fragmented based on segmentation of the tagged video for each pre-determined interval of time.

5. The computer-implemented display method as recited in claim 1, further comprising segregating at the interactive video system with the processor, the one or more mapped fragments of the one or more tagged fragments into the one or more logical sets of mapped fragments, wherein the one or more mapped fragments being segregated based on a positive mapping of keywords from the set of preference data with the set of tags associated with each tagged fragment of the one or more tagged fragments.

6. The computer-implemented display method as recited in claim 1, wherein the semantic context information comprises an object specific context information and scene specific context information of each mapped fragment and each logical set of mapped fragments.

7. The computer-implemented display method as recited in claim 1, further comprising clustering at the interactive video system with the processor, the one or more logical sets of mapped fragments into corresponding one or more logical clusters of mapped fragments.

8. The computer-implemented display method as recited in claim 1, further comprising assembling at the interactive video system with the processor, at least one of the one or more logical clusters of mapped fragments in a second pre-defined order of preference to obtain the assembled video, wherein each logical cluster of mapped fragments being clustered based on analysis of the set of preference data of the user and the semantic context information, wherein the second pre-defined order of preference being derived from the set of preference data and the user profile.

9. The computer-implemented display method as recited in claim 1, wherein the set of user authentication data comprises an email address, an authentication key, a physical location and a time of request of video.

10. The computer-implemented display method as recited in claim 1, further comprising transcoding at the interactive video system with the processor, the assembled video into a pre-defined video format by utilizing a codec, wherein the assembled video being transcoded to enable adaptive bitrate streaming based on one or more device parameters and one or more network parameters, wherein the one or more device parameters comprises screen size, screen resolution and pixel density and wherein the one or more network parameters comprises an IP address, network bandwidth, maximum bitrate support over network, throughput, connection strength and location of requesting server.

11. The computer-implemented display method as recited in claim 1, further comprising rendering at the interactive video system with the processor, the assembled video for adding one or more interactive elements and bi-directional flow.

12. The computer-implemented display method as recited in claim 1, wherein the one or more pre-defined regions comprises one or more video interactivity windows, one or more slots between the assembled video and one or more overlay regions covering a pre-defined area of the assembled video.

13. The computer-implemented display method as recited in claim 1, further comprising updating at the interactive video system with the processor, the set of preference data associated with the user, the user profile, the assembled video in the digitally processed repository of videos in the real time and the set of user feedbacks.

14. The computer-implemented display method as recited in claim 1, wherein the first pre-defined order of preference being set based on previous feedbacks from the user.

15. A computer system comprising:
one or more processors; and
a memory coupled to the one or more processors, the memory for storing instructions which, when executed by the one or more processors, cause the one or more processors to perform a method for enabling display of interactive questions during streaming of a real time, dynamic, adaptive and non-sequentially assembled video, the method comprising:
receiving at an interactive video system, a set of preference data associated with a user from a pre-defined selection criteria corresponding to a digitally processed repository of videos and a set of user authentication data, wherein the pre-defined selection criteria comprises a set of intervals of video broadcast, a physical location of the user, an identified name of a celebrity and a category of video;
serving at the interactive video system, an assembled video corresponding to the received set of preference data to the user in real time;
fetching at the interactive video system, a pre-defined set of interactive questions, wherein the pre-defined set of interactive questions being fetched for obtaining a set of user feedbacks, wherein the pre-defined set of interactive questions being based on a content of each assembled video, a quality and satisfaction associated with platform, user experience, quality of service, requirement of recommendations and a user profile, wherein the user profile being created based on the set of user authentication data and the set of preference data, wherein the user profile comprises the set of preference data segregated on a basis of the pre-defined selection criteria, the set of user authentication data, a past set of preference data, a physical location of the user and a bio data of the user;
posting at the interactive video system, the pre-defined set of interactive questions during the serving of the assembled video, wherein the pre-defined set of interactive questions being posted in a first pre-defined order of preference, wherein the pre-defined set of interactive questions being posted based on semantic context information mined from the set of preference data of the user and one or more tagged videos, a real time viewing and selection behavior of the user, a request of the user for a series of questions, dynamic requests of posting questions from one or more publishers, wherein the semantic context information being mined from each mapped fragment of one or more mapped fragments and each logical set of mapped fragments of one or more logical sets of mapped fragments and wherein each interactive question of the pre-defined set of interactive question being posted in at least one of one or more pre-defined regions; and collecting at the interactive video system, the set of user feedbacks corresponding to the posted pre-defined set of interactive questions from the user, wherein the set of user feedbacks being collected in the real time.

16. The computer system as recited in claim 15, further comprising pushing at the interactive video system with the processor, the pre-defined set of interactive questions from at least one of the one or more publishers, one or more system administrators, one or more third party content managers and one or more sponsors, wherein the pre-defined set of interactive questions being pushed in the real time.

17. A non-transitory computer-readable storage medium encoding computer executable instructions that, when executed by at least one processor, performs a method for enabling display of interactive questions during streaming of real time, dynamic, adaptive and non-sequentially assembled video, the method comprising:

receiving at a computing device, a set of preference data associated with a user from a pre-defined selection criteria corresponding to a digitally processed repository of videos and a set of user authentication data, wherein the pre-defined selection criteria comprises a set of intervals of video broadcast, a physical location of the user, an identified name of a celebrity and a category of video;

serving at the computing device, an assembled video corresponding to the received set of preference data to the user in real time;

fetching at the computing device, a pre-defined set of interactive questions, wherein the pre-defined set of interactive questions being fetched for obtaining a set of user feedbacks, wherein the pre-defined set of interactive questions being based on a content of each assembled video, a quality and satisfaction associated with platform, user experience, quality of service, requirement of recommendations and a user profile, wherein the user profile being created based on set of user authentication data and the set of preference data, wherein the user profile comprises the set of preference data segregated on a basis of the pre-defined selection criteria, the set of user authentication data, a past set of preference data, a physical location of the user and a bio data of the user;

posting at the computing device, the pre-defined set of interactive questions during the serving of the assembled video, wherein the pre-defined set of interactive questions being posted in a first pre-defined order of preference, wherein the predefined set of interactive question being posted based on a semantic context information mined from the set of preference data of the user and one or more tagged videos, a real time viewing and selection behavior of the user, a request of the user for a series of questions, dynamic requests of posting questions from one or more publishers, wherein the semantic context information being mined from each mapped fragment of one or more mapped fragments and each logical set of mapped fragments of one or more logical sets of mapped fragments and wherein each interactive question of the pre-defined set of interactive question being posted in at least one of one or more pre-defined regions; and collecting at the computing device, the set of user feedbacks corresponding to the posted pre-defined set of interactive questions from the user, wherein the set of user feedbacks being collected in the real time.

18. The non-transitory computer-readable storage medium as recited in claim 17, further comprising instructions for pushing at the computing device, the pre-defined set of interactive questions from at least one of the one or more publishers, one or more system administrators, one or more third party content managers and one or more sponsors, wherein the pre-defined set of interactive questions being pushed in the real time.

* * * * *